(12) United States Patent
Condon et al.

(10) Patent No.: US 10,307,667 B2
(45) Date of Patent: *Jun. 4, 2019

(54) REMOTE-CONTROL FLYING CRAFT

(71) Applicant: QFO Labs, Inc., Bloomington, MN (US)

(72) Inventors: John Paul Condon, Minneapolis, MN (US); James Edward Fairman, Bloomington, MN (US); Bradley Dean Pedersen, Minneapolis, MN (US); Thomas Edward KraMer, Andover, MN (US); Scott Andrew Melanson, Hopkins, MN (US)

(73) Assignee: QFO Labs, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,310

(22) Filed: Jun. 19, 2017

(65) Prior Publication Data

US 2018/0008891 A1    Jan. 11, 2018

Related U.S. Application Data

(60) Continuation of application No. 14/686,335, filed on Apr. 14, 2015, now Pat. No. 9,682,316, which is a
(Continued)

(51) Int. Cl.
*A63H 27/127*  (2006.01)
*A63F 13/235*  (2014.01)
(Continued)

(52) U.S. Cl.
CPC ............ *A63F 13/235* (2014.09); *A63F 13/00* (2013.01); *A63F 13/245* (2014.09);
(Continued)

(58) Field of Classification Search
USPC ......... 446/34, 36, 37, 38, 48, 219, 454, 456, 446/457; 244/17.11, 17.23, 17.25
See application file for complete search history.

(56) References Cited

U.S. PATENT DOCUMENTS

| | | |
|---|---|---|
| 129,402 A | 7/1872 | Goodrum |
| 730,097 A | 6/1903 | Crawford et al. |
| (Continued) | | |

FOREIGN PATENT DOCUMENTS

| | | |
|---|---|---|
| EP | 1245257 A2 | 10/2002 |
| KR | 10-0661618 B1 | 12/2006 |
| WO | WO 2011152702 A1 | 12/2011 |

OTHER PUBLICATIONS

Frazzoli, et al., "Real-time motion planning for agile autonomous vehicles", "Journal of Guidance, Control, and Dynamics", Jan.-Feb. 2002, pp. 116-129, vol. 25, No. 1.
(Continued)

*Primary Examiner* — Kurt Fernstrom
(74) *Attorney, Agent, or Firm* — Charles A. Lemaire; Jonathan M. Rixen; Lemaire Patent Law Firm, P.L.L.C.

(57) ABSTRACT

A hovering remote-control flying craft having a molded frame assembly includes a plurality of arms extending from a center body with an electric motor and corresponding propeller on each arm. In various embodiments, the motor and propeller are mounted downward-facing at a distal portion of each arm with a motor cover over the motor. The center body can be formed of a two-piece molded structure that sandwiches a circuit board to provide structural support for the frame. The circuit board can include a plurality of tabs that facilitate mounting of wire connectors, and can also provide antennas and emitters for both IR and RF communications. In some embodiments, a removable safety ring protects the propellers from lateral contact.

19 Claims, 21 Drawing Sheets

Related U.S. Application Data division of application No. 13/842,525, filed on Mar. 15, 2013, now Pat. No. 9,004,973.

(60) Provisional application No. 61/710,671, filed on Oct. 5, 2012, provisional application No. 61/710,665, filed on Oct. 5, 2012.

(51) Int. Cl.

| | |
|---|---|
| *A63H 27/00* | (2006.01) |
| *A63H 17/32* | (2006.01) |
| *A63H 17/00* | (2006.01) |
| *A63F 13/00* | (2014.01) |
| *A63H 30/04* | (2006.01) |
| *G05D 1/00* | (2006.01) |
| *A63F 13/245* | (2014.01) |
| *A63F 13/837* | (2014.01) |
| *A63H 13/00* | (2006.01) |
| *F21V 23/04* | (2006.01) |
| *F41G 1/36* | (2006.01) |
| *F21L 4/02* | (2006.01) |
| *A63H 33/26* | (2006.01) |

(52) U.S. Cl.
CPC ........... *A63F 13/837* (2014.09); *A63H 13/00* (2013.01); *A63H 17/00* (2013.01); *A63H 17/32* (2013.01); *A63H 27/12* (2013.01); *A63H 30/04* (2013.01); *G05D 1/0033* (2013.01); *A63H 27/00* (2013.01); *A63H 33/26* (2013.01); *A63H 2200/00* (2013.01); *B64C 2201/027* (2013.01); *B64C 2201/042* (2013.01); *B64C 2201/146* (2013.01); *B64C 2203/00* (2013.01); *F21L 4/027* (2013.01); *F21V 23/0435* (2013.01); *F41G 1/36* (2013.01)

(56) References Cited

U.S. PATENT DOCUMENTS

| | | |
|---|---|---|
| 905,547 A | 12/1908 | Macduff |
| 931,966 A | 8/1909 | Sinclair |
| 996,627 A | 7/1911 | Eggert |
| 1,012,631 A | 12/1911 | Gridley |
| 1,291,345 A | 1/1919 | Zimdars |
| 1,405,035 A | 1/1922 | Hunt |
| 1,816,707 A | 7/1931 | Wardell |
| 1,911,041 A | 5/1933 | Smyser |
| 1,959,270 A | 5/1934 | Hedloff |
| 2,077,471 A | 4/1937 | Fink |
| 2,461,435 A | 2/1949 | Neumann et al. |
| 2,567,392 A | 9/1951 | Naught |
| 2,728,537 A | 12/1955 | Elkins |
| 2,730,311 A | 1/1956 | Doak |
| 2,863,261 A | 12/1958 | Mead |
| 2,876,965 A | 3/1959 | Streib |
| 2,949,693 A | 8/1960 | McRoskey |
| 2,953,321 A | 9/1960 | Robertson et al. |
| 2,968,318 A | 1/1961 | Bauman |
| 2,968,453 A | 1/1961 | Bright |
| 2,988,301 A | 6/1961 | Fletcher |
| 3,002,709 A | 10/1961 | Cochran |
| 3,053,480 A | 9/1962 | Vanderlip |
| 3,199,809 A | 8/1965 | Modesti |
| 3,394,906 A | 7/1968 | Rogers |
| 3,395,876 A | 8/1968 | Green |
| 3,402,488 A | 9/1968 | Leavitt |
| 3,442,469 A | 5/1969 | Davis |
| 3,477,168 A | 11/1969 | Trodglen, Jr. |
| 3,503,573 A | 3/1970 | Modesti |
| 3,508,360 A | 4/1970 | Williams |
| 3,528,284 A | 9/1970 | Skoglund et al. |
| 3,557,304 A | 1/1971 | Rue et al. |
| 3,568,358 A | 3/1971 | Bruce |
| 3,608,033 A | 9/1971 | Hall |
| 3,677,503 A | 7/1972 | Freemen, Jr. |
| 3,752,417 A | 8/1973 | Lagace |
| 3,933,325 A | 1/1976 | Kaelin |
| 3,946,970 A | 3/1976 | Blankenship |
| 4,065,873 A | 1/1978 | Jones |
| 4,161,843 A | 7/1979 | Hui |
| 4,196,877 A | 4/1980 | Mutrux |
| 4,214,720 A | 7/1980 | De Sautel |
| 4,273,302 A | 6/1981 | Jordan |
| 4,386,748 A | 6/1983 | Jordan |
| 4,457,476 A | 7/1984 | Andresevitz |
| 4,461,436 A | 7/1984 | Messina |
| 4,566,699 A | 1/1986 | Cucuzza |
| D292,194 S | 10/1987 | Moller |
| 4,778,128 A | 10/1988 | Wright et al. |
| 4,795,111 A | 1/1989 | Moller |
| 4,796,836 A | 1/1989 | Buchelt |
| 4,804,156 A | 2/1989 | Harmon |
| 4,880,071 A | 11/1989 | Tracy |
| 4,955,962 A | 9/1990 | Mell |
| 5,035,377 A | 7/1991 | Buchelt |
| 5,049,031 A | 9/1991 | Mintenko et al. |
| 5,064,143 A | 11/1991 | Bucher |
| 5,067,674 A | 11/1991 | Heyche et al. |
| 5,071,383 A | 12/1991 | Kinoshita |
| 5,072,892 A | 12/1991 | Carrington |
| 5,082,079 A | 1/1992 | Lissaman et al. |
| 5,128,671 A | 7/1992 | Thomas, Jr. |
| 5,150,857 A | 9/1992 | Moffitt et al. |
| 5,152,478 A | 10/1992 | Cycon et al. |
| 5,178,344 A | 1/1993 | Dlouhy |
| 5,203,521 A | 4/1993 | Day |
| 5,213,284 A | 5/1993 | Webster |
| 5,240,207 A | 8/1993 | Eiband et al. |
| 5,259,571 A | 11/1993 | Blazquez |
| 5,277,380 A | 1/1994 | Cycon et al. |
| 5,295,643 A | 3/1994 | Ebbert et al. |
| 5,297,759 A | 3/1994 | Tilbor et al. |
| 5,351,911 A | 10/1994 | Neumayr |
| 5,383,363 A | 1/1995 | Kulmaczewski |
| 5,407,150 A | 4/1995 | Sadleir |
| 5,421,538 A | 6/1995 | Vassa (Suratano Thienphropa) |
| 5,429,542 A | 7/1995 | Britt, Jr. |
| 5,440,817 A | 8/1995 | Watson et al. |
| 5,503,351 A | 4/1996 | Vass |
| 5,575,438 A | 11/1996 | McGonigle et al. |
| 5,634,839 A | 6/1997 | Dixon |
| 5,672,086 A | 9/1997 | Dixon |
| 5,676,344 A | 10/1997 | Graffin |
| 5,746,930 A | 5/1998 | Belcher et al. |
| 5,854,843 A | 12/1998 | Jacknin et al. |
| 5,873,545 A | 2/1999 | Kapin et al. |
| 5,890,441 A | 4/1999 | Swinson et al. |
| 5,904,724 A | 5/1999 | Margolin |
| 5,971,320 A | 10/1999 | Jermyn et al. |
| 5,988,562 A | 11/1999 | Linick |
| 6,050,250 A | 4/2000 | Kerkau |
| 6,053,451 A | 4/2000 | Yu |
| 6,179,247 B1 | 1/2001 | Milde, Jr. |
| 6,224,452 B1 | 5/2001 | Morse |
| 6,227,485 B1 | 5/2001 | Porte |
| 6,254,032 B1 | 7/2001 | Bucker |
| 6,260,796 B1 | 7/2001 | Klingensmith |
| 6,270,036 B1 | 8/2001 | Lowe, Jr. |
| 6,270,038 B1 | 8/2001 | Cycon et al. |
| 6,273,370 B1 | 8/2001 | Colgren |
| 6,302,229 B1 | 10/2001 | Triebel |
| 6,332,103 B1 | 12/2001 | Steenson, Jr. et al. |
| 6,371,406 B1 | 4/2002 | Corcoran |
| 6,375,117 B1 | 4/2002 | Cain |
| 6,398,159 B1 | 6/2002 | Di Stefano |
| 6,421,622 B1 | 7/2002 | Horton et al. |
| 6,431,494 B1 | 8/2002 | Kinkead et al. |
| 6,450,445 B1 | 9/2002 | Moller |
| 6,450,446 B1 | 9/2002 | Holben |
| 6,457,670 B1 | 10/2002 | Geranio et al. |
| 6,464,166 B1 | 10/2002 | Yoeli |

(56) References Cited

U.S. PATENT DOCUMENTS

| | | |
|---|---|---|
| D465,196 S | 11/2002 | Dammar |
| 6,539,290 B1 | 3/2003 | Vos |
| 6,547,180 B1 | 4/2003 | Cassidy |
| 6,572,053 B2 | 6/2003 | Salas |
| 6,575,401 B1 | 6/2003 | Carver |
| 6,581,872 B2 | 6/2003 | Walmsley |
| 6,588,701 B2 | 7/2003 | Yavnai |
| 6,592,071 B2 | 7/2003 | Kinkead et al. |
| 6,604,706 B1 | 8/2003 | Bostan |
| 6,609,945 B2 | 8/2003 | Jiminez et al. |
| 6,626,078 B2 | 9/2003 | Thornton |
| 6,688,936 B2 | 2/2004 | Davis |
| 6,694,228 B2 | 2/2004 | Rios |
| 6,708,920 B2 | 3/2004 | Fukuyama |
| 6,735,500 B2 | 5/2004 | Nicholas et al. |
| 6,743,101 B2 | 6/2004 | Leiferi et al. |
| 6,761,637 B2 | 7/2004 | Weston |
| 6,824,095 B2 | 11/2004 | Mao |
| 6,843,447 B2 | 1/2005 | Morgan |
| 6,843,699 B2 | 1/2005 | Davis |
| 6,847,865 B2 | 1/2005 | Carroll |
| 6,899,586 B2 | 5/2005 | Davis |
| 7,017,911 B1 | 3/2006 | Chia |
| 7,032,861 B2 | 4/2006 | Sanders, Jr. et al. |
| 7,127,333 B2 | 10/2006 | Arvidsson |
| 7,255,623 B2 | 8/2007 | Davis |
| 7,488,231 B2 | 2/2009 | Weston |
| 7,491,111 B2 | 2/2009 | Ghaly |
| 7,497,759 B1 | 3/2009 | Davis |
| 7,500,917 B2 | 3/2009 | Barney |
| 7,614,958 B2 | 11/2009 | Weston |
| 7,704,119 B2 | 4/2010 | Evans |
| 7,793,890 B2 | 9/2010 | Scherer |
| 7,794,302 B2 | 9/2010 | Davis |
| 7,931,239 B2 | 4/2011 | Pedersen et al. |
| 8,019,447 B2 | 9/2011 | Hoisington et al. |
| 8,049,600 B2 | 11/2011 | Beard et al. |
| 8,109,802 B2 | 2/2012 | Chui et al. |
| 8,200,375 B2 | 6/2012 | Stuckman et al. |
| 8,214,088 B2 | 7/2012 | Lefebure |
| 8,328,128 B2 | 12/2012 | Wiggerich |
| 8,337,308 B2 | 12/2012 | Ito et al. |
| 8,473,123 B2 | 6/2013 | Sun et al. |
| 8,473,125 B2 | 6/2013 | Rischmuller et al. |
| 8,474,761 B2 | 7/2013 | Callou |
| 8,498,447 B2 | 7/2013 | Derbanne |
| 8,599,646 B2 | 12/2013 | Pochon |
| 8,662,438 B2 | 3/2014 | Savoye et al. |
| 8,725,314 B2 | 5/2014 | Chaperon et al. |
| 8,818,083 B2 | 8/2014 | Jonchery et al. |
| 8,958,928 B2 | 2/2015 | Seydoux |
| 8,983,684 B2 | 3/2015 | Callou et al. |
| 9,625,905 B2 | 4/2017 | Rosenberg |
| 2002/0104921 A1 | 8/2002 | Louvel |
| 2009/0284553 A1 | 11/2009 | Seydoux |
| 2010/0009735 A1 | 1/2010 | Seydoux |
| 2010/0178966 A1 | 7/2010 | Seydoux |
| 2011/0049290 A1 | 3/2011 | Seydoux |
| 2012/0056041 A1 | 3/2012 | Rhee et al. |
| 2012/0221179 A1 | 8/2012 | Lee et al. |
| 2012/0241555 A1 | 9/2012 | Savoye et al. |

OTHER PUBLICATIONS

Gavrilets, Vladislav, "Avionics systems development for small unmanned aircraft", "Diss. Massachusetts Institute of Technology", Jun. 1998.

Gordon, et al., "Rotorcraft Aerial Robot—Challenges and Solutions", "Digital Avionics Systems Conference", Oct. 25-28, 1993.

"Miniature Aircraft USA X-Cell 60 helicopter—drawings and manual, dated Jan. 9, 1995, 73 page", "downladable (in 2 parts) from: http://alshobbysite.com/rchelibase/xcell/ma0503-1.pdf and: http://alshobbysite.com/rchelibase/xcell/ma0503-2.pdf",, Publisher: Miniature Aircraft USA.

Kroo, et al., "The Mesicopter: A Meso-Scale Flight Vehicle NIAC Phase I Final Report", May 31, 1999, Publisher: Stanford University.

Kroo, et al., "The Mesicopter: A Miniature Rotorcraft Concept Phase II Interim Report", Jul. 2000, Publisher: Stanford University.

Kroo, et al., "The Mesicopter: A Miniature Rotorcraft Concept Phase II Final Report", Nov. 2001, Publisher: Stanford University.

Kroo, et al., "Mesoscale Flight and Miniature Rotorcraft Development.", Jan. 2002, pp. 503-517, Publisher: Published in T.J. Mueller, 'Fixed and Flapping Wing Aerodynamics for Micro Air Vehicle Applications, Progress in Astronautics and Aeronautics.

Committee on Materials, Structures, and Aeronautics for Advanced Uninhabited Air Vehicles, "Uninhabited Air Vehicles: Enabling Science for Military Systems", "Publication NMAB-495", 2000 no month listed, Publisher: National Academy Press, Washington, D.C.

Shim, et al., "A comprehensive study of control design for an autonomous helicopter", "Proc. 37th IEEE Conf. on Decision and Control (CDC'98),", Dec. 1998.

Shim, et al., "Hierarchical control system synthesis for rotorcraft-based unmanned aerial vehicles", "AIAA Guidance, Navigation and Control Conference.", Aug. 14-17, 2000.

Weilenmann, et al., "Robust helicopter position control at hover", "American Control Conference, 1994. vol. 3. IEEE", Jan. 1994.

REMOTE-CONTROL FLYING CRAFT

CROSS-REFERENCE TO RELATED APPLICATIONS

This application is a continuation of U.S. patent application Ser. No. 14/686,335 filed Apr. 14, 2015, titled "REMOTE-CONTROL FLYING COPTER" (which issued as U.S. Pat. No. 9,682,316 on Jun. 20, 2017), which is a divisional of U.S. patent application Ser. No. 13/842,525 filed Mar. 15, 2013, titled "REMOTE-CONTROL FLYING COPTER AND METHOD" (which issued as U.S. Pat. No. 9,004,973 on Apr. 14, 2015), which claims benefit of U.S. Provisional Patent Application 61/710,665 filed Oct. 5, 2012, titled "REMOTE-CONTROL FLYING COPTER," and claims benefit of U.S. Provisional Patent Application 61/710,671 filed Oct. 5, 2012, titled "WIRELESS COMMUNICATION SYSTEM FOR GAME PLAY WITH MULTIPLE REMOTE CONTROL FLYING CRAFT," each of which is incorporated herein by reference in its entirety.

This invention is also related to prior U.S. Design Patent Application No. 29/433,939 filed Oct. 5, 2012, titled "Single-Handed Controller for a Remote Control Flying Craft" (which issued as U.S. Design Pat. No. D691,217 on Oct. 8, 2013); and to U.S. patent application Ser. No. 13/843,490, filed Mar. 15, 2013, titled "WIRELESS COMMUNICATION SYSTEM FOR GAME PLAY WITH MULTIPLE REMOTE-CONTROL FLYING CRAFT" (which issued as U.S. Pat. No. 9,011,250 on Apr. 21, 2015); each of which is incorporated herein by reference in its entirety.

TECHNICAL FIELD

The invention relates generally to the field of heavier-than-air aeronautical vehicles that are sustained in air by the force of a fluid such as air. More particularly, the present invention relates to remote-control, hovering-type flying vehicles.

BACKGROUND

Remote-control flying vehicles are becoming increasingly more popular and sophisticated. While larger craft such as military and civilian drone aircraft have been in use for only the last two decades, smaller radio-controlled flying vehicles built and flown by hobbyists have been around for much longer. Generally, remote-control flying vehicles are either fixed wing, like a plane, or hovering, like a helicopter or quadcopter.

One example of a smaller, hovering type craft is described in U.S. Pat. No. 7,931,239, entitled "Homeostatic Flying Hovercraft," which teaches the use of a homeostatic hover control system in combination with a hand-held controller to cause the craft to mimic the orientation of the controller in terms of yaw, pitch, roll, and lateral flight maneuvers. Another example of a quadcopter is the Parrot AR Drone that utilizes a Wi-Fi connection between the quadcopter and a smart phone or tablet that serves as a tilt-based remote control. Still another example is the Walkera QR Lady Bird brand mini-quadcopter that is controlled via a conventional dual joystick remote control. These kinds of electronically stabilized hovercraft or quadcopter designs with three or more separate rotors are generally more stable and easier to learn to fly than the single shaft, dual counter-rotating rotor, model helicopters that may use some form of mechanical gyro stabilization. And, like the Lady Bird mini-quadcopter, these less-expensive single-shaft, dual counter-rotating rotor, model helicopters are typically controlled via a conventional dual joystick remote control.

A problem with current designs for these kinds of smaller, hovering remote-control flying craft is that the competing design considerations of weight, cost and performance have resulted in a very limited set of designs for how these craft are constructed. The design of the single-shaft model helicopters has the dual counter-rotating rotors on the top of the craft where they are exposed to obstacles both above and to the sides of the rotors. Running the rotors into an obstacle, like a ceiling when flying indoors, almost always causes the craft to crash and potentially suffer damage as a result. The design of most quadcopters utilizes a cross configuration formed of very stiff, carbon-fiber rods that hold the motors away from the center of the craft. Stiff carbon-fiber rods are used to minimize the torsion and vibration that occurs in a quadcopter design when the motors are not mounted in the center of gravity of the craft as is done in a single-shaft, counter-rotating helicopter design.

These existing designs for smaller, hovering remote-control flying craft suffer from various problems, including cost of manufacture, ease of operation, accuracy of navigation, durability, and safety during operation, among others problems. There is a need for an inexpensive, yet robust design for a smaller, hovering remote-control flying craft.

SUMMARY

Embodiments of this invention relate to a smaller, hovering flying craft adapted to be controlled by a handheld remote control having a molded frame assembly including a center body formed of a top member having at least three arms integrally molded with and extending outwardly from the center body and a bottom member having at least three legs integrally molded with and extending downwardly from the center body, at least three motor assemblies that each include an electromechanical motor and at least one corresponding propeller operably mounted downwardly-facing, with at least one motor assembly operably mounted at a distal portion of each of the at least three arms, a circuit-board assembly operably mounted to the center body and configured to control the craft in response to radio frequency signals from the handheld remote control, and a replaceable rechargeable battery insertable into a battery compartment defined by the top member and the bottom member and operably connectable to electrically power the circuit-board assembly and the at least three motor assemblies.

Embodiments relate to a hovering flying craft system including a hovering flying craft having a frame assembly including a center body having at least three arms extending outwardly from the center body, at least three motor assemblies that each include an electromechanical motor and at least one corresponding propeller mounted at a distal portion of each arm, a circuit-board assembly operably mounted to the center body and configured to control the craft in response to radio-frequency signals and to control an infrared emitter and an infrared receiver; and a replaceable rechargeable battery insertable into the frame assembly and operably connectable to electrically power the circuit-board assembly and the at least three motor assemblies. In embodiments, the system includes a handheld controller configured to allow a user to control the hovering flying craft by providing inputs for an intended pitch and attitude of the hovering flying craft, and a thrust and yaw of the hovering flying craft, the controller having a trigger assembly adapted to be manipulated by a finger of the user to provide the user with a control for sending commands to control at least the infrared emitter on the hovering flying craft, a control processor configured to provide control signals to a radio that generates the radio-frequency signals for communication to and control of the hovering flying craft and the infrared emitter, and a battery to electrically power the handheld controller.

Embodiments also relate to a system for wirelessly reprogramming a hovering flying craft and a handheld controller, the hovering flying craft adapted to be controlled by the handheld controller including a hovering flying craft including a craft processor and a craft radio, the craft radio comprising a craft radio processor, a handheld controller including a controller processor and a controller radio, the controller radio comprising a controller radio processor, a computing device including a computing device processor and computing device memory, wherein the computing device processor is configured to store craft operating code in the computing device memory, store controller operating code in the computing device memory, package the craft operating code according to the protocol of the craft radio, and package the controller operating code according to the protocol of the controller radio; and a wireless interface adapted to transmit the packaged craft operating code from the computing device to the craft radio and the packaged controller operating code from the computing device to the controller radio, wherein the craft operating code is programmed within the craft processor by the craft radio processor, and the controller operating code is programmed within the controller processor by the controller radio processor after transmission of the craft operating code and the controller operating code along the wireless interface.

In various embodiments, a smaller, hovering remote-control flying craft includes features to support aerial game play based on both infrared (IR) and radio frequency (RF) communications, including a pairing button, an infrared emitter and sensor configured for aerial game play, a high-intensity light-emitting diode (LED) output for indicating team selection, and a vacuum-formed shell with windows and internal reflective surfaces for enhancing the visibility of light-emitting diode (LED) output.

In other various embodiments, the aforementioned features can be combined in any fashion such that certain embodiments can include all, some, or even one of these features, and not others.

Embodiments of the smaller, hovering remote-control flying craft of the present invention are small enough to safely fly in small indoor areas, but powerful enough to fly outdoors. Due to the rugged, lightweight design and only the four motors as moving parts, the hovering remote-control flying craft of the present invention is more durable than existing designs.

The hovering remote-control flying craft can be controlled by a single-handed controller to be used by a user for controlling the craft, the controller comprising a controller body having an angled shape and including a flat top surface for orientation reference of the controller, a trigger projecting from the controller body adapted to interface with a forefinger of the user, a top hat projecting from the flat top surface adapted to interface with a thumb of the user; and electronics including at least one accelerometer, a processor for sampling data from the at least one gyroscope and at least one accelerometer, and a radio adapted to transmit the sampled data to the vehicle antenna(s).

In various embodiments, a single-handed remote controller has a reference surface on top of the controller, in combination with a top hat arrangement and a trigger button, internal components having structure for supporting and mounting one or more circuit boards and a rechargeable battery, control sequences (which, in some embodiments, are transmitted (e.g., wirelessly or otherwise) to the associated craft) for changing the associated craft from novice mode to expert mode and vice versa, a USB (universal serial bus) connection for charging the remote controller, components for the selection of a team, including synchronization of the associate craft team, light-emitting diode (LED) output identifying a team color, a selectively vibrating motor to indicate status of the associated craft (by providing a vibrating sensation that can be felt by the person holding the remote controller), and wireless pairing components, including an easy-to-use wireless pairing button. In other various embodiments, the aforementioned features can be combined in any fashion such that certain embodiments can include all, some, or even one of these features, and not others.

The single-handed remote controller can be tilted forward, back, left, or right, and the corresponding controlled flying vehicle responds accordingly, thereby providing total one-handed control over the vehicle. In embodiments, the controller has an ergonomic design made for the human hand. In embodiments, the same controller is comfortable and easy to use both for right-handed or left-handed pilots. Moreover, the controller exemplifies U.S. Air Force Human Factors data considerations for aircraft controls, creating a realistic and high-tech interface.

The above summary of the invention is not intended to describe each illustrated embodiment nor every implementation of the present invention. The figures and the detailed description that follow more particularly exemplify some of these embodiments.

BRIEF DESCRIPTION OF THE DRAWINGS

The invention may be more completely understood in consideration of the following detailed description of various embodiments of the invention in connection with the accompanying drawings, in which.

Figure 1:
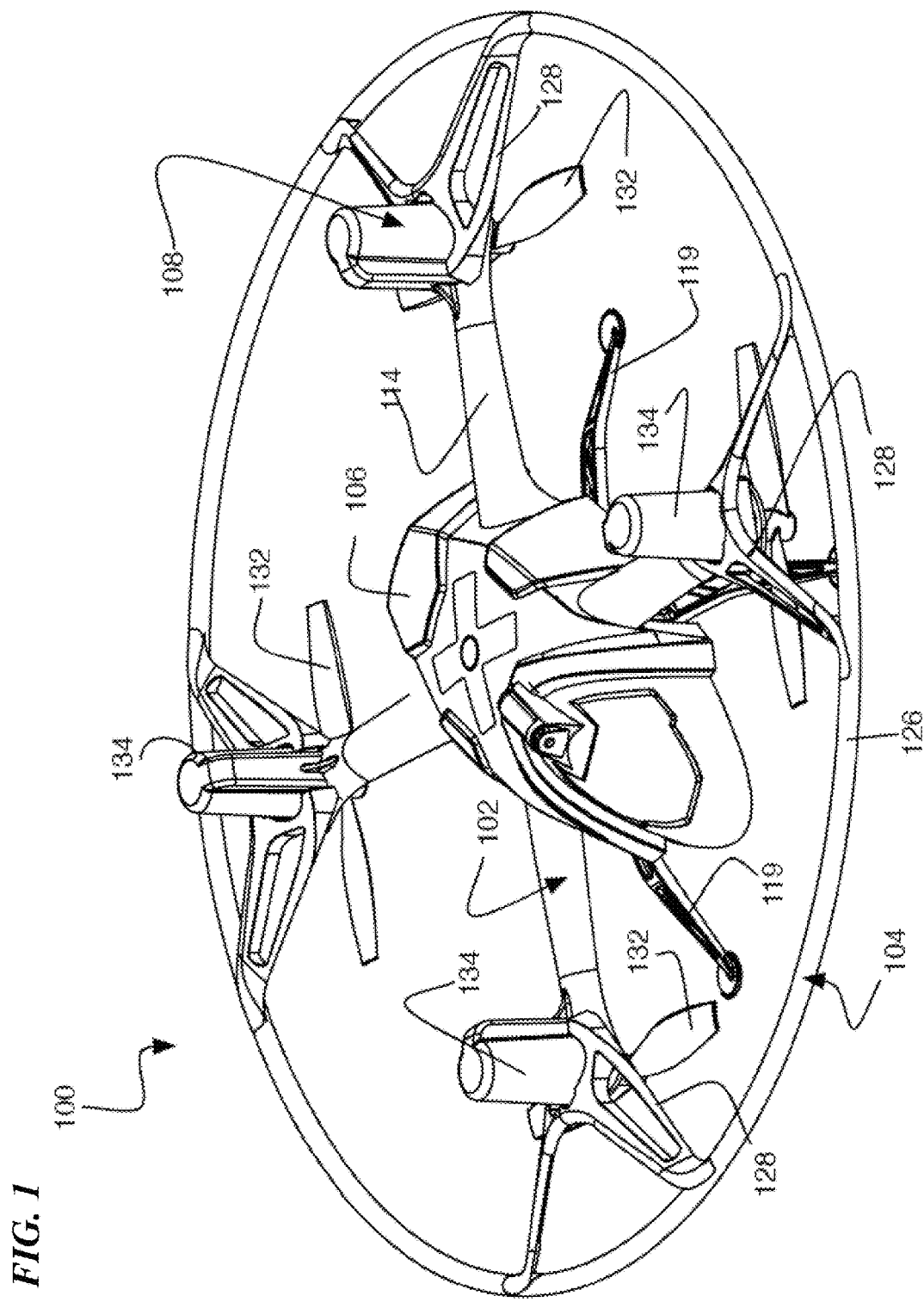
FIG. 1 is a perspective view of a hovering remote-control flying craft 100, according to an embodiment.
Figure 2:
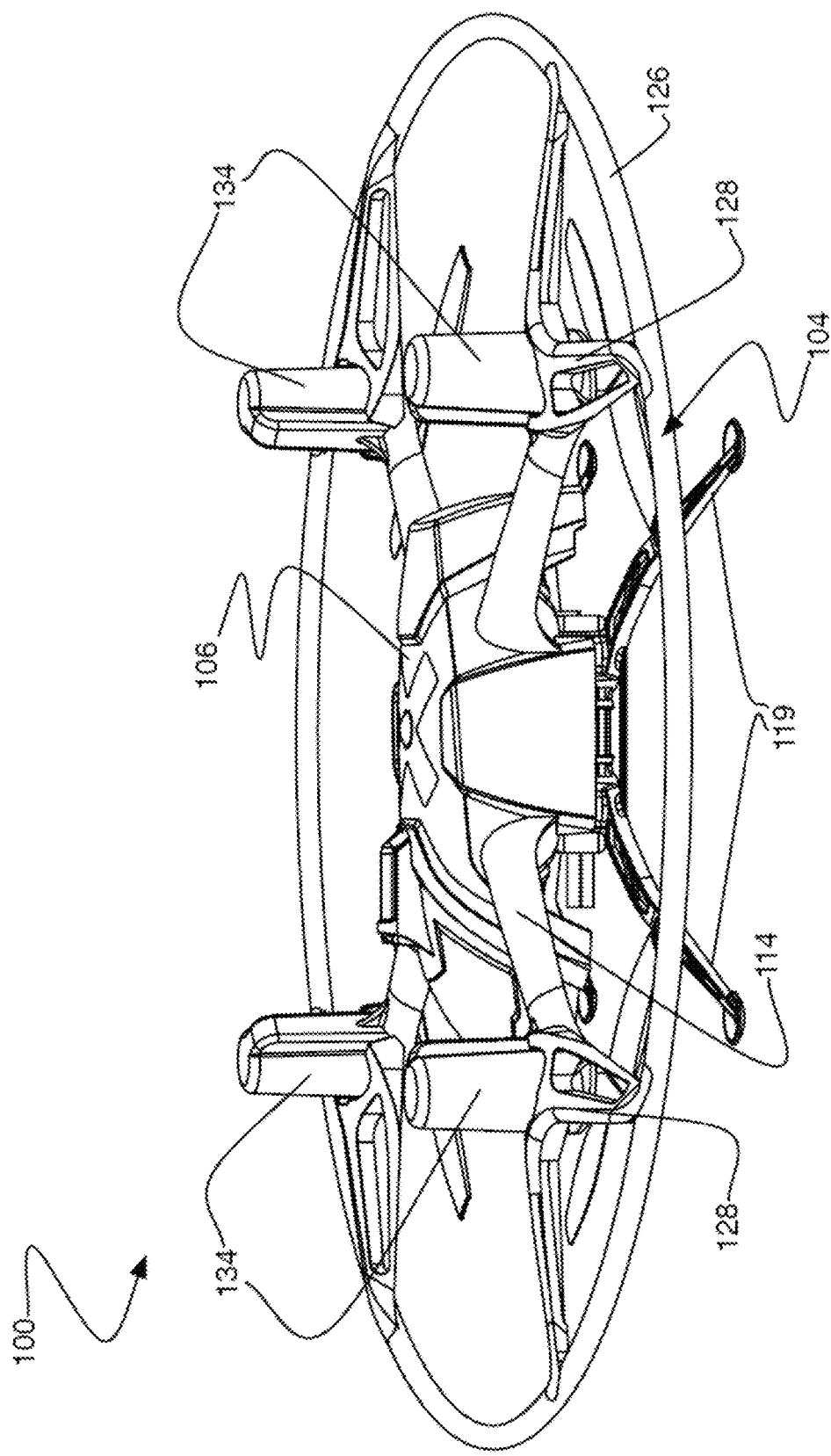
FIG. 2 is a side back perspective view of the smaller, hovering remote-control flying craft smaller, hovering remote-control flying craft 100 of FIG. 1, according to an embodiment.
Figure 3:
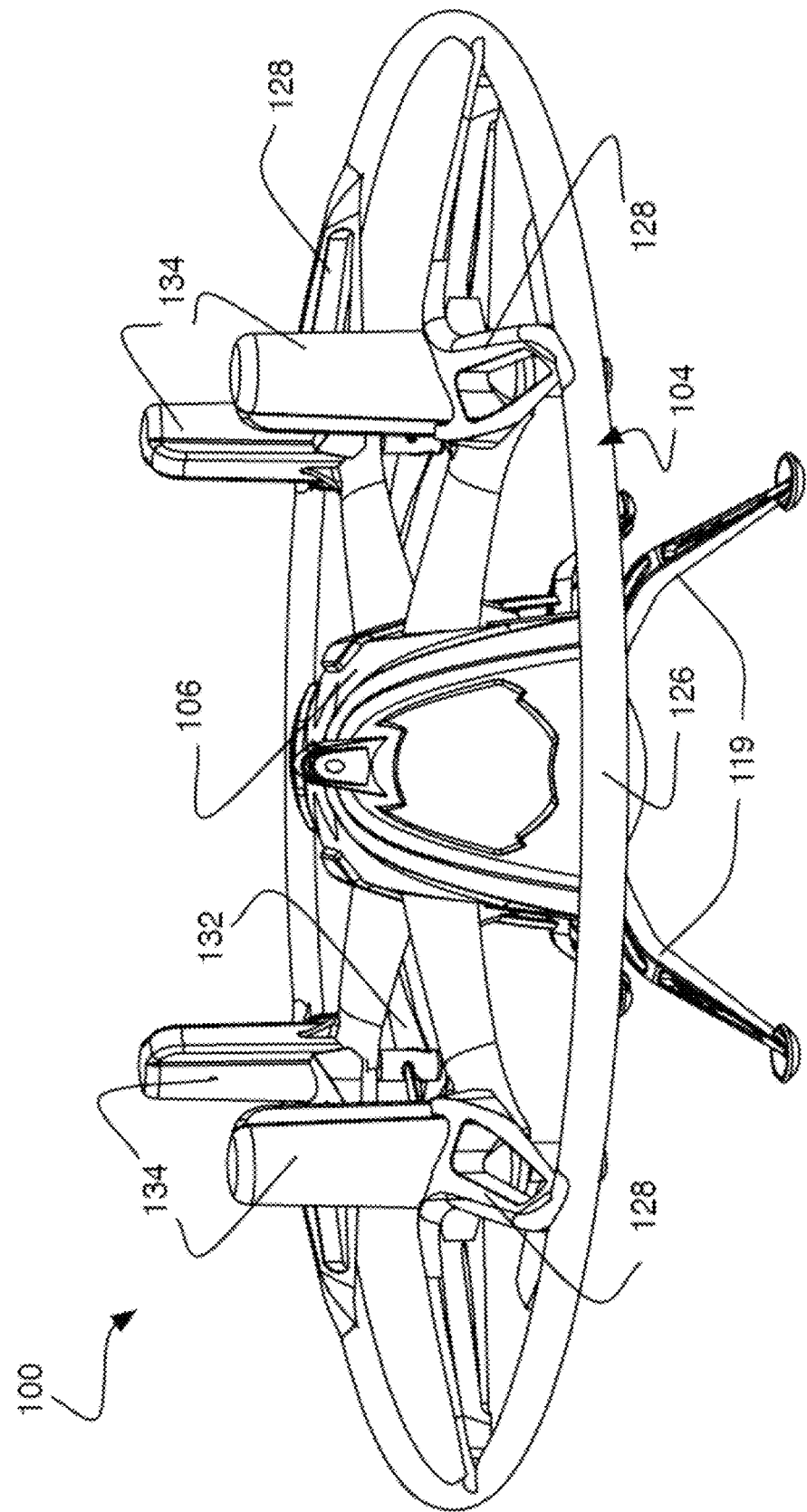
FIG. 3 is a side front perspective view of the hovering remote-control flying craft 100 of FIG. 1, according to an embodiment.
Figure 4:
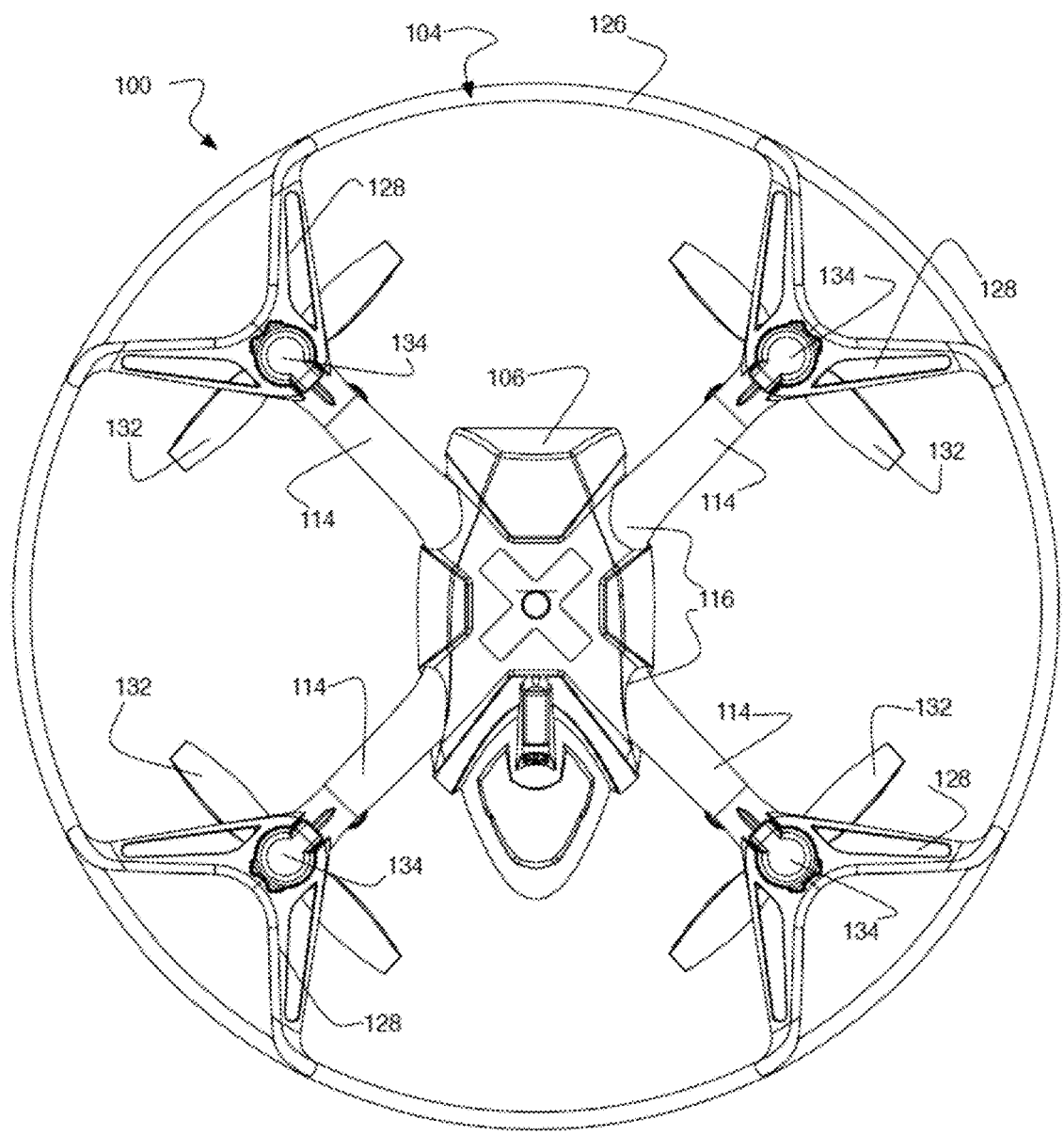
FIG. 4 is a top plan view of the hovering remote-control flying craft 100 of FIG. 1, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Referring generally to FIGS. 1-7, according to an embodiment of the invention, a hovering remote-control flying craft 100 is depicted. Hovering remote-control flying craft 100 generally comprises a molded frame assembly 102, an optional removable safety ring 104, a shell 106, a plurality of motor assemblies 108, and a circuit-board assembly 110. In various embodiments, the plurality of motor assemblies 108 may number greater or less than four, thereby creating a craft other than a quadcopter. The components of frame assembly 102, removable safety ring 104, and other components are thereby adaptable to support the defined number of motor assemblies 108 of any particular craft, but are described herein for ease of illustration as a hovering remote-control flying craft 100 having four discrete motor assemblies 108. The intention is not to limit the invention to only the particular embodiments described.

Molded frame assembly 102 generally comprises a center body 112 and a plurality of arms 114 each extending from a plurality of shoulders 116 of center body 112, thereby creating a stiff molded frame. In embodiments, molded frame assembly 102 can be made of molded polymer (commonly called plastic), including thermoplastics, thermosets, and elastomers, and optionally including fillers and/or entrapped gas bubbles or passages (to reduce weight) and/or optionally including reinforcing agents such as polymer fibers and/or glass fibers and the like. As used herein, the term "plastic" means any suitable polymer material and composites thereof.

Figure 6:
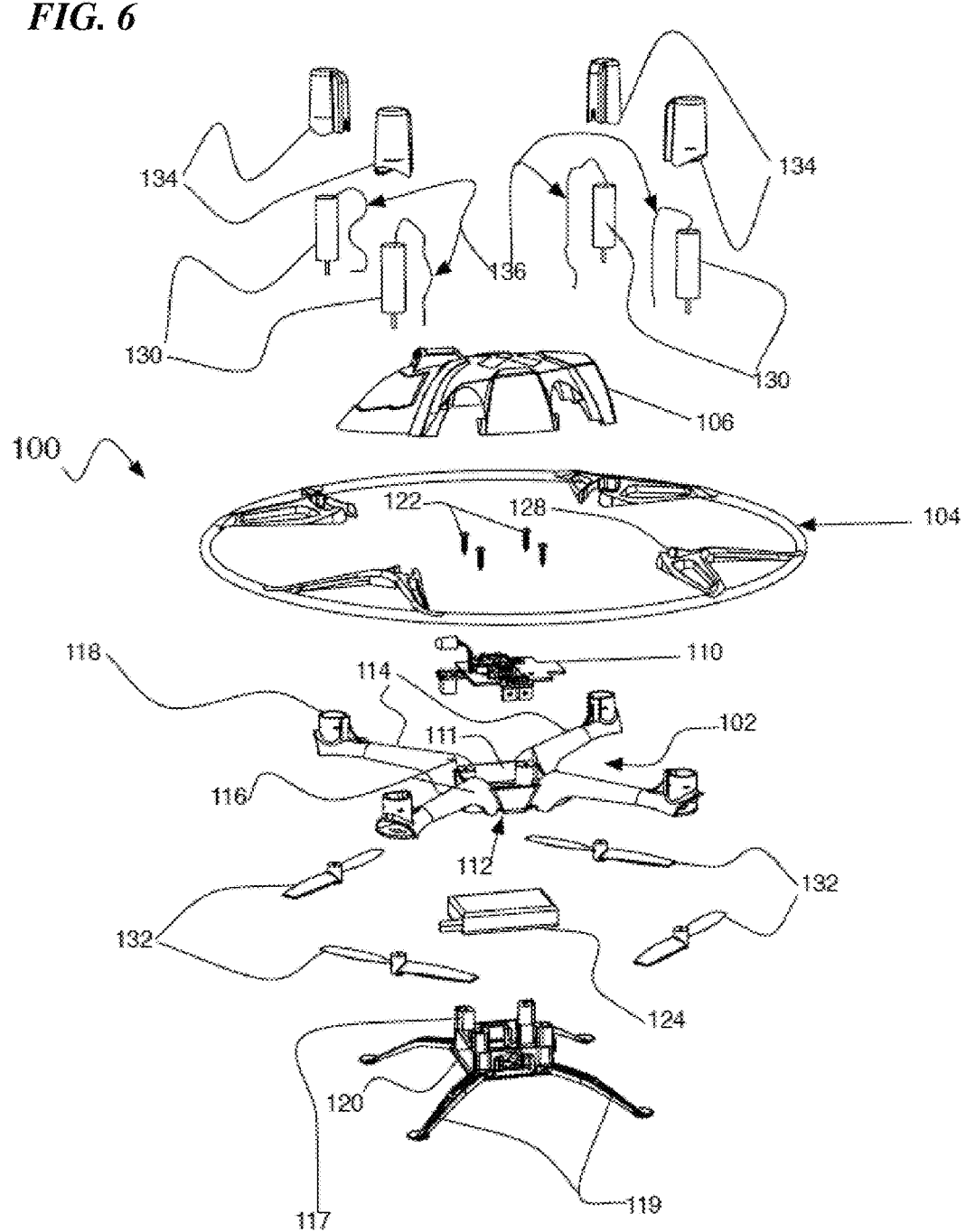
FIG. 6 is an exploded side perspective view of a kit of parts for hovering remote-control flying craft 100, according to an embodiment.
Figure 7:
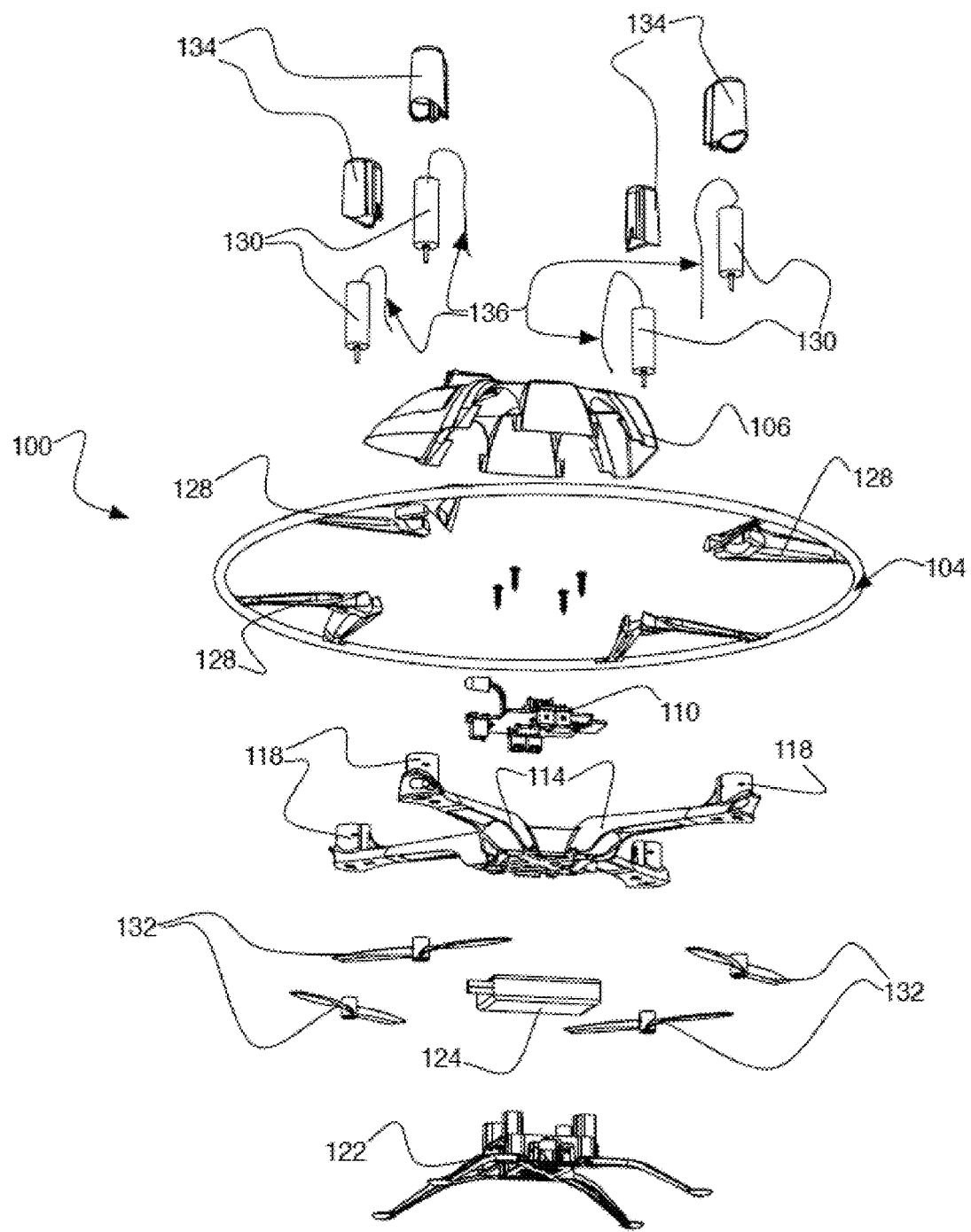
FIG. 7 is an exploded perspective view of a kit of parts for hovering remote-control flying craft 100, according to an embodiment.

Center body 112, in an embodiment, includes structure defining an aperture or frame adapted to operably couple to circuit-board assembly 110 to secure circuit-board assembly 110 in place. As depicted in the embodiment of FIGS. 6-7, center body 112 can be shaped roughly like a square or other parallelogram, with cutouts or projections for circuit board assembly 110, as will be described. It will be seen that the combination of the circuit-board assembly 110 in the structure of the center body 112 serves to add structural integrity and rigidity to the molded frame assembly 102.

In some embodiments, each of shoulders 116 has a rounded portion of frame extending from a relative "corner" of center body 112 and curving distally away from center body 112. Each of arms 114 extends therefrom further distally away from center body 112. Each of arms 114 can include an intra-arm channel such that time and cost is saved in production by limiting production materials to those outside the channel while providing a conduit for routing of wires from the motor assemblies 108. Arms 114 extend from shoulder 116, and more specifically, center body 112, to allow room for motor assemblies 108 to operate. The combination of shoulder 116 and arm 114 thereby forms a generally L-shaped structure, each extending generally orthogonal to the next adjacent combination of shoulder 116 and arm 114 from center body 112, so that the first set of two arms 114 lie along the same axis, and the second set of two other arms 114 lie along another axis that is perpendicular to the axis of the first set of arms 114.

In embodiments, molded frame assembly 102 is a two-piece assembly that can include a top member 111 forming center body 112 with at least three arms 114 integrally molded with and extending outwardly from center body 112 and a bottom member 117 having at least three legs 119 integrally molded with and extending downwardly. In an embodiment, top member 111 is formed of an injectable molded plastic having a durometer greater than 70 Shore D and bottom member 117 is formed of an injectable molded plastic having a durometer less than 60 Shore D. In some embodiments, top member 111 is formed of ABS plastic with a durometer of about 75 Shore D and bottom member 117 is formed of a low density polypropylene plastic with a durometer of about 55 Shore D.

In these embodiments for a molded frame assembly 102 that is a two-piece assembly, the top member 111 is stiffer than the bottom member 117 so as to provide rigidity of the arms 114 to decrease torsion and resonance vibrations that can otherwise interfere with the accelerometers and gyroscope sensors on circuit board assembly 110, while the bottom member 117 is more flexible to enhance durability of the assembly during landings and crashes. In other embodiments, molded frame assembly 102 may be a single piece mold that may optionally have top and bottom portions with differing durometers.

A motor housing 118 is located at the distal end of each arm 114. Motor housing 118 is adapted to secure the operational components of motor assemblies 108. In an embodiment, as depicted, motor housing 118 comprises an open-ended cylinder, but can be otherwise shaped, depending on the shape of the specific motor assemblies 108. Distally further beyond motor housing 118 along each of arms 114, the ends of arms 114 are shaped to snap-fit with portions of removable safety ring 104 and portions of each motor assembly 108. In an embodiment, each of these ends are angled relative to the rest of arm 114 to adapt to a corresponding projecting portion of removable safety ring 104 such that arm 114 can fit over the projecting portion of removable safety ring 104.

In the prior art, the conventional carbon-fiber "X" configuration used to address vibration issues, suffers from cost and assembly issues, among others. Frame assembly 102 of some embodiments of the invention remedies these problems. The molded body of center body 112 having arms 114 extending from shoulders 116, in combination with the solid arms 114 with an intra-arm channel instead of struts or a beam configuration as in the prior art, provides a solid base to absorb vibration, while reducing weight. In an embodiment, the use of circuit-board assembly 110 as a major structural support as operably coupled to center body 112, as will be described, provides stiffness and strength to frame assembly 102.

In an embodiment, referring to FIGS. 6 and 7, center body 112 further comprises a battery compartment member 120. Corner screws 122 sandwich the circuit-board assembly 110 between battery-compartment member 120 and shoulders 116 to create the center shape. Replaceable and rechargeable battery 124 is shown in FIG. 6 offset from the other components of frame assembly 102 for ease of viewing, and in line with the other components of frame assembly 102 in FIG. 7.

In embodiments, battery compartment member 120 is defined by the top member and bottom member of center body 112 as described above.

In another embodiment, frame assembly 102 is formed as a single-piece (not shown), and includes a battery-compartment member 120 and plurality of arms 114, with the circuit-board assembly 110 operably coupled to the single-piece frame in the corners of center body 112 by screws or snap-fit.

In embodiments, the height of center body 112 in the vertical axis of hovering remote-control flying craft 100, and optionally in combination with battery-compartment member 120 and corner screws 122, provides enough clearance for the rotational components of the downward-facing motor assemblies 108.

Removable safety ring 104 generally comprises an outer band 126 and a plurality of Y-arms 128. Outer band 126, in an embodiment, comprises a circular band of material that surrounds the components of hovering remote-control flying craft 100 with a diameter large enough so that each of the rotational components of motor assemblies 108 has room to operate. Effectively, outer band 126 provides the bounds of the footprint of the hovering remote-control flying craft 100. Therefore, outer band 126 is configured to protect propellers of each motor assembly 108 from lateral contact. In other embodiments, outer band 126 is not perfectly circular, but is instead formed in an oblong or oval shape, or in other embodiments, has a polygon shape. In embodiments, outer band 126 can be made of plastic polymer(s), metal, or other lightweight, yet durable material.

Individual Y-arms 128 extend from the inner surface of outer band 126 proximate the location of arms 114, and spaced similarly to the extension location of arms 114 away from center frame 112, at arms 114 respective distal locations. Each of the upper extending prongs of each Y-arm 128 is operably coupled to the inner surface of outer band 126. The stem of the Y thereby projects toward the relative center of the circle formed by outer band 126 towards center frame 112. Each of Y-arms 128 includes a projecting portion on the stem that is adapted to interface with each of ends of arms 114 and each of motor assemblies 108. As depicted, four Y-arms 128 extend from the inner surface of outer band 126, but a greater or lesser number of Y-arms 128 can also be utilized to support the defined number of motor assemblies 108 of any particular vehicle.

Figure 8:
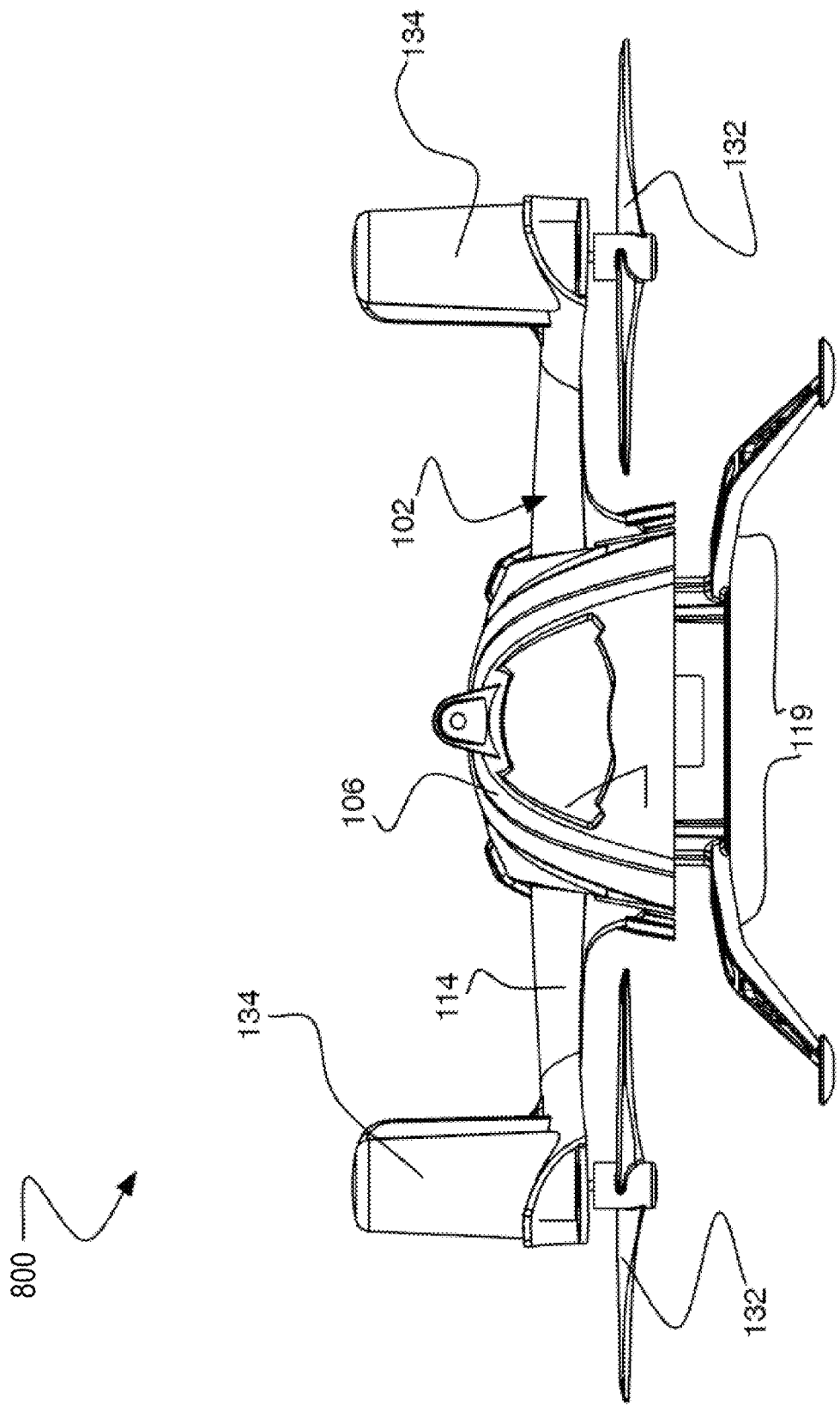
FIG. 8 is a side front view of a hovering remote-control flying craft 800, which is equivalent to craft 100 without a safety ring, according to an embodiment.
Figure 9:
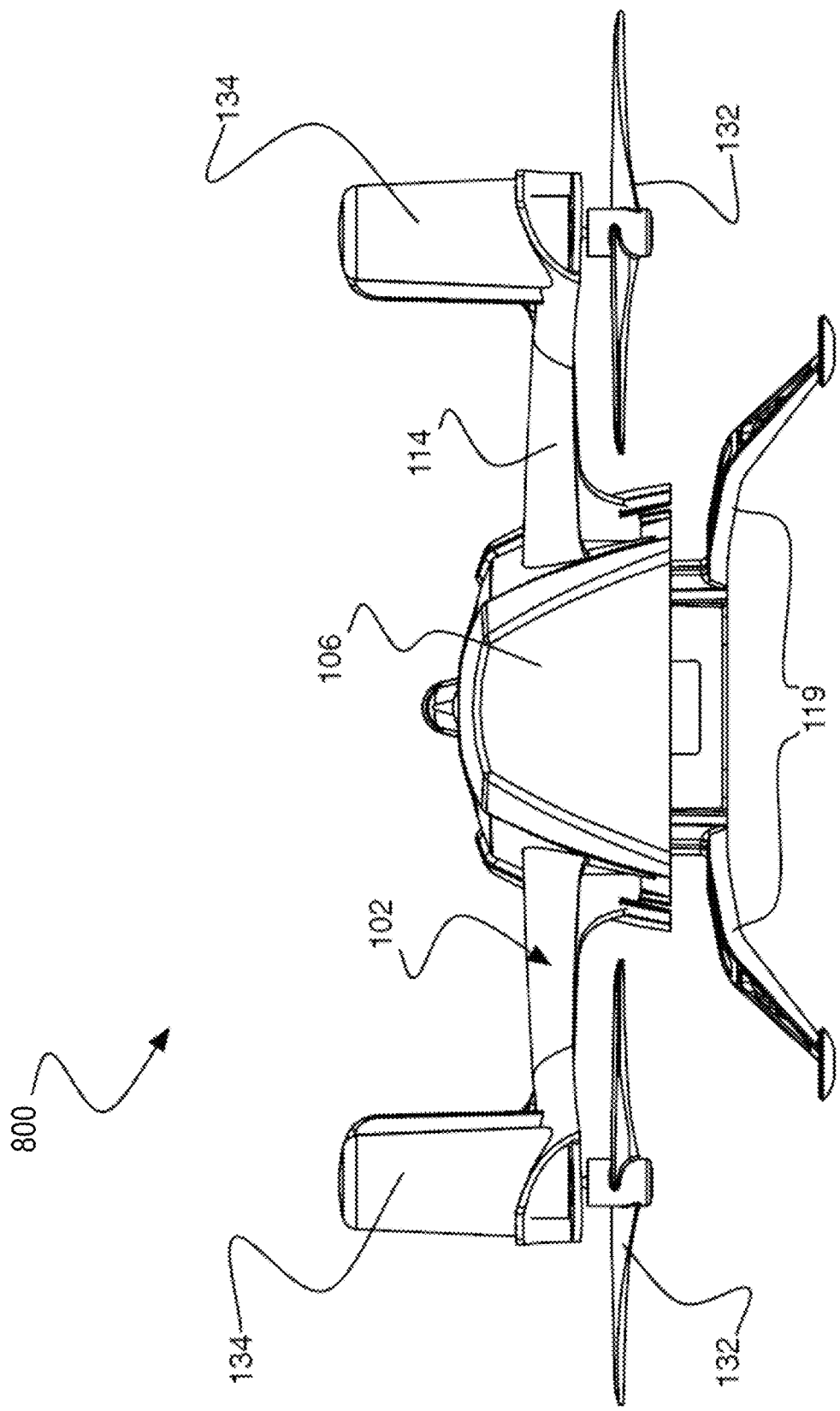
FIG. 9 is a side back view of hovering remote-control flying craft 800, according to an embodiment.
Figure 10:
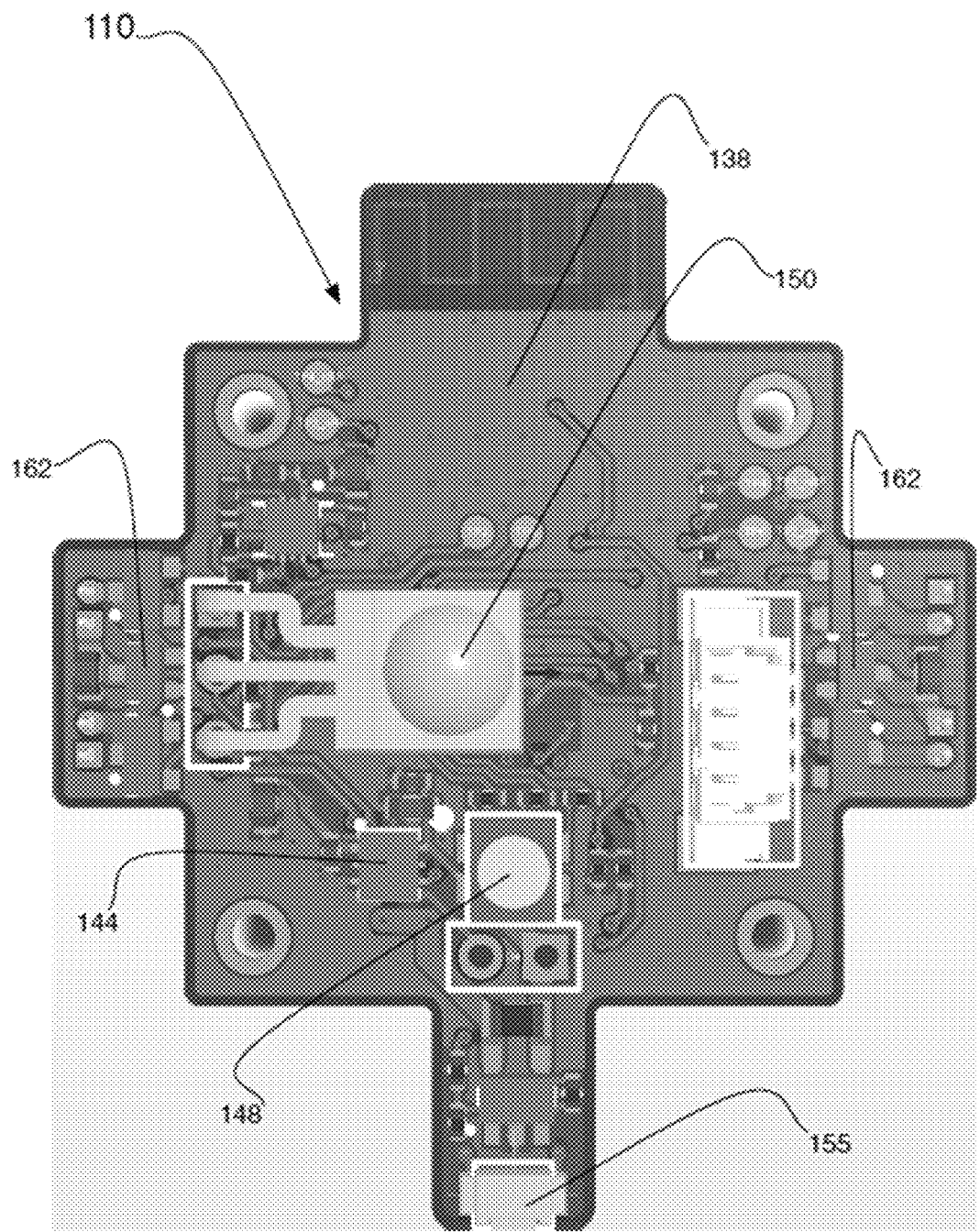
FIG. 10 is a top plan view of a circuit board for a hovering remote-control flying craft, according to an embodiment.
Figure 11:
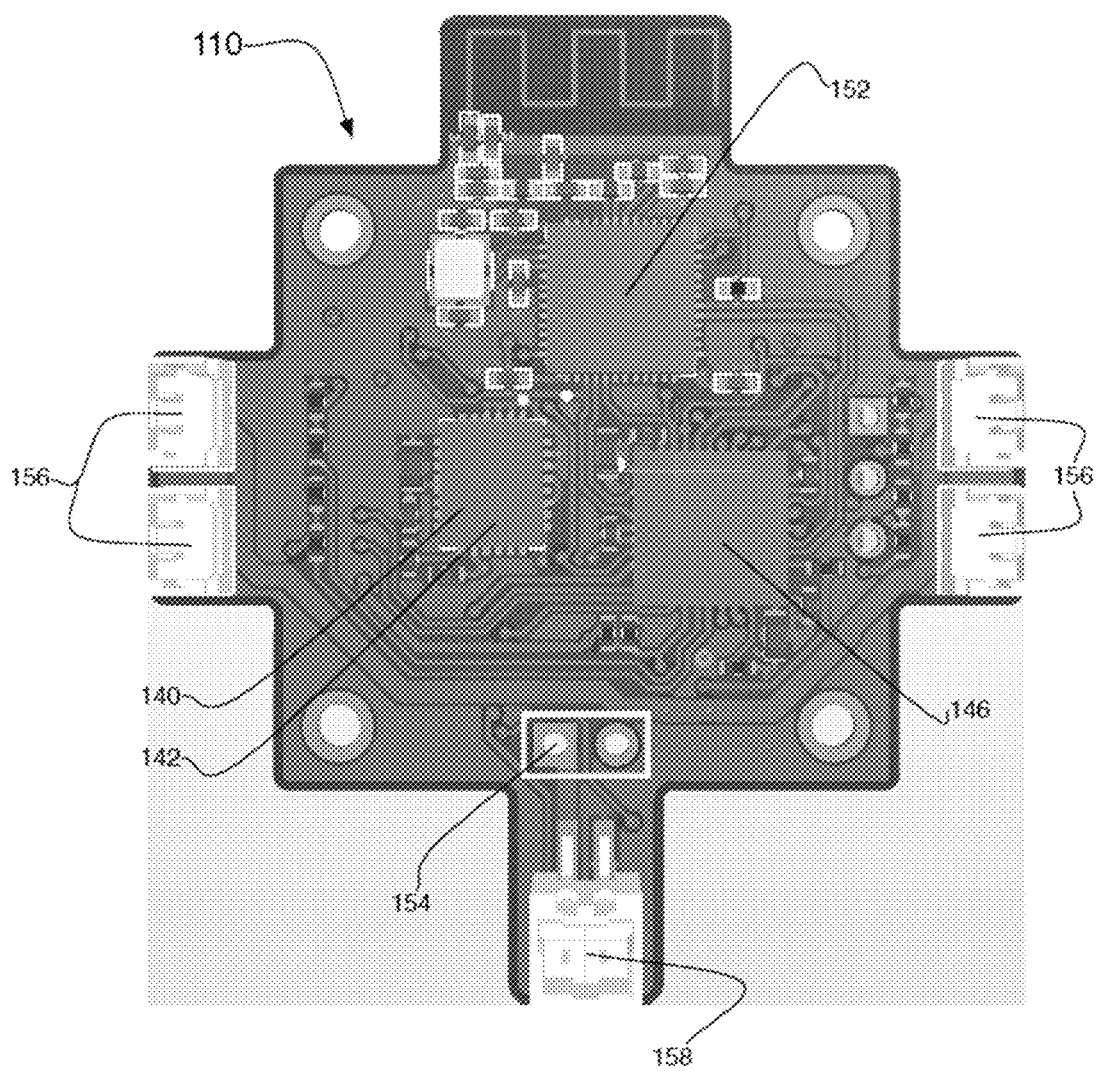
FIG. 11 is a bottom plan view of a circuit board for a hovering remote-control flying craft, according to an embodiment.
Figure 12:
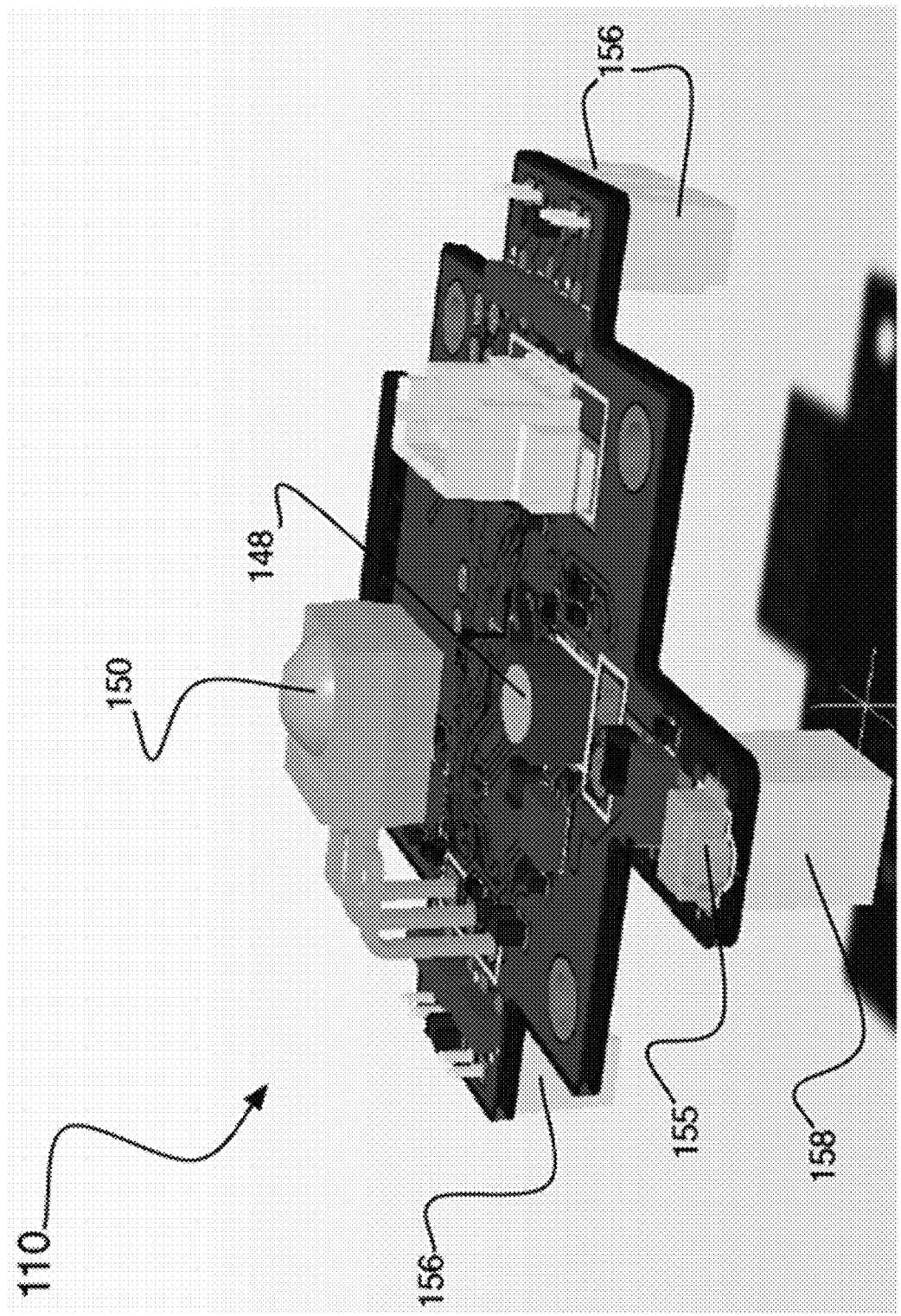
FIG. 12 is a perspective view of the circuit board for a hovering remote-control flying craft of FIG. 10, according to an embodiment.
Figure 13:
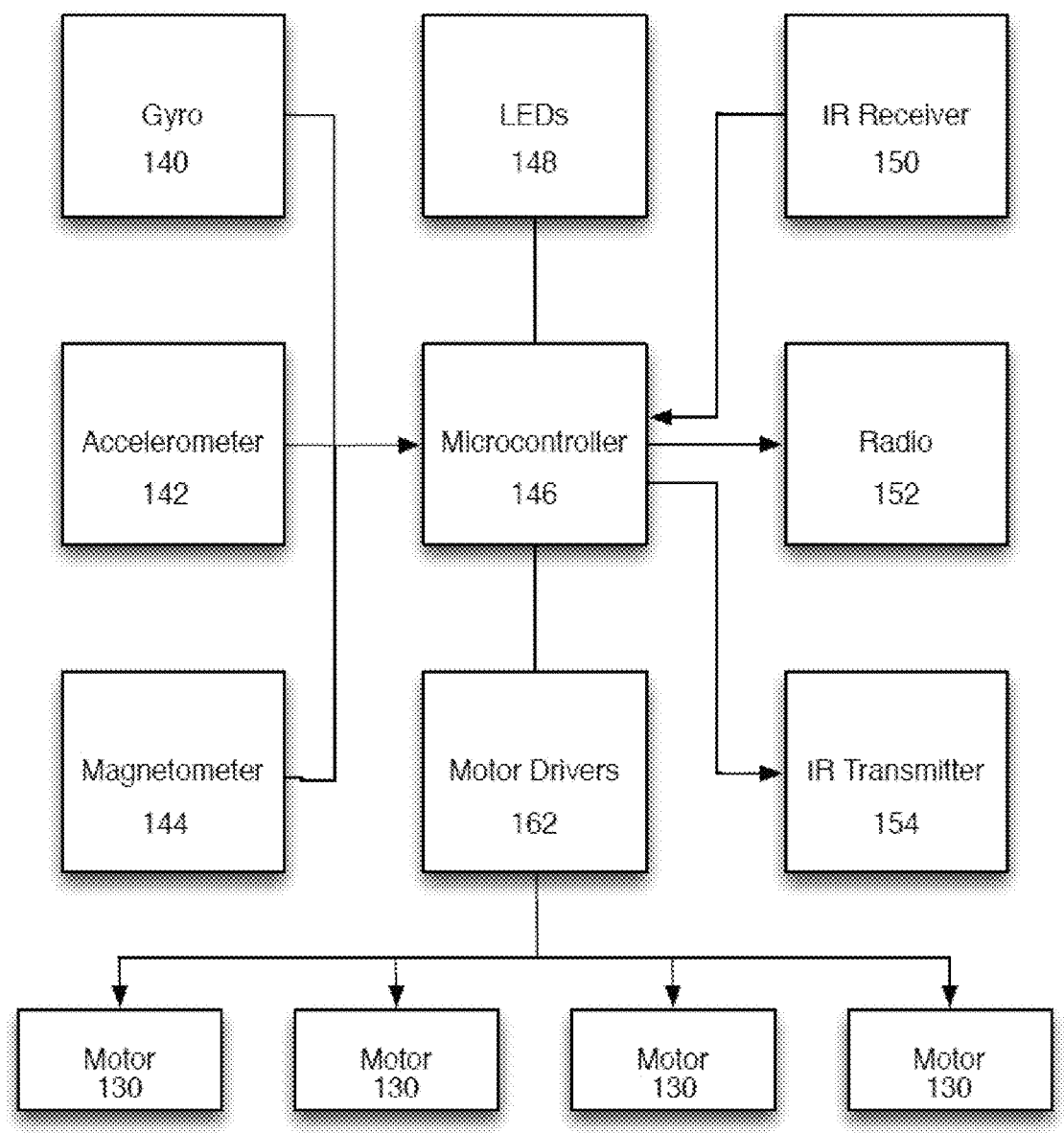
FIG. 13 is a block diagram of the components of the circuit board of FIG. 10, according to an embodiment.

A common problem exists for all aeronautical vehicles that utilize propellers, rotors, or other rotating means for propulsion. The propellers can be damaged by objects in the vehicle's flight path, and further, there is a danger to the user or others from the rotating propellers. In the prior art, myriad solutions have been tried, including the use of a conventional wire "globe" encompassing the entire craft, or a foam enclosure around each propeller. However, these solutions are aesthetically unpleasing and often hinder the craft's functionality. In embodiments of the present invention, the removable safety ring 104 provides a minimally-intrusive outer band 126 for protection. Further, the Y-arms 128 extending from the outer band 126 distribute impact forces and/or stiffen the craft. Additionally, the snap-on functionality of removable safety ring 104 allows for easy transition between operation with and without removable safety ring 104. FIGS. 8-9 depict a hovering remote-control flying craft 800, which is equivalent to craft 100 without safety ring 104, according to an embodiment.

Figure 5:
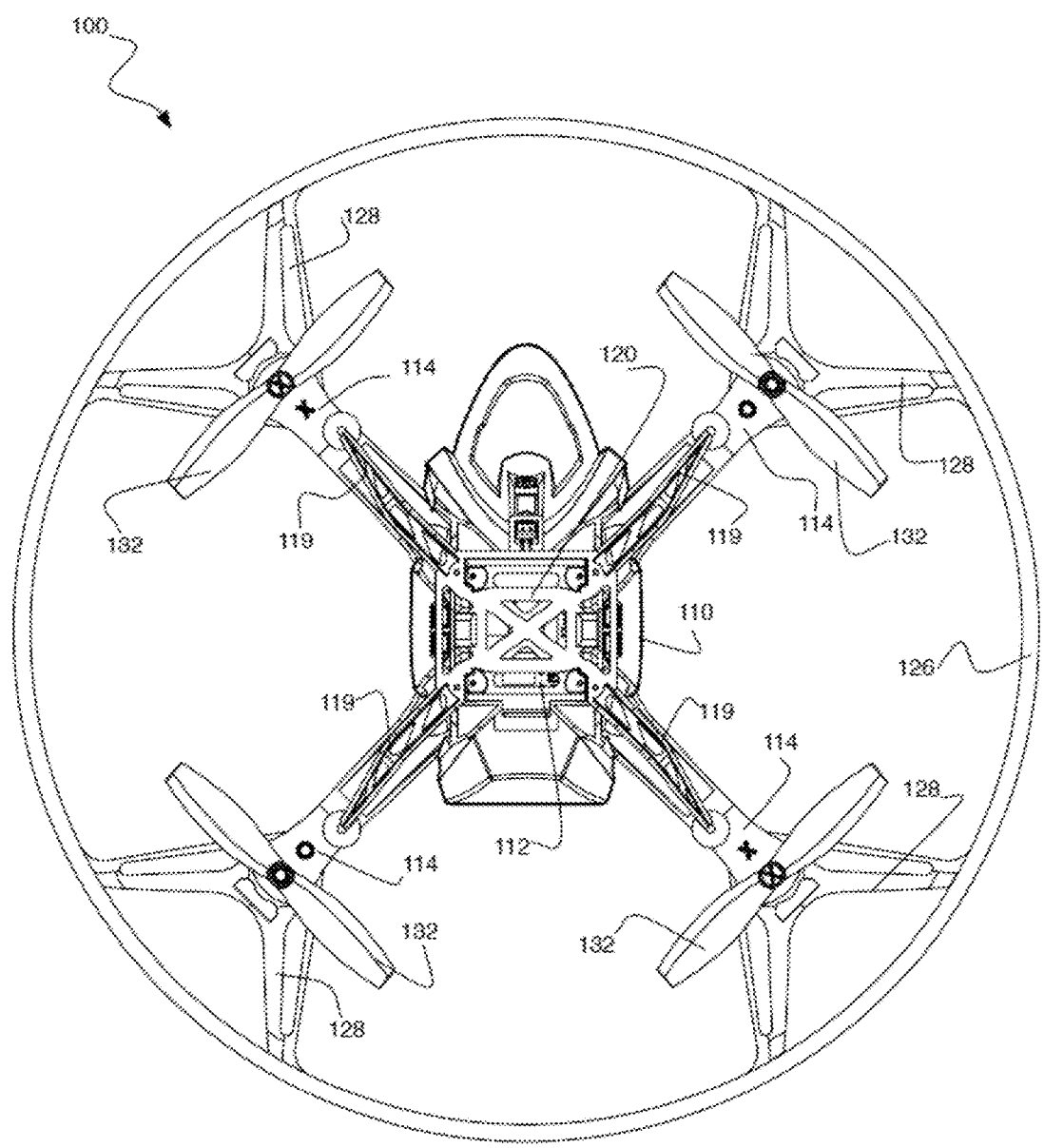
FIG. 5 is a bottom plan view of the hovering remote-control flying craft 100 of FIG. 1, according to an embodiment.

Shell 106 provides an enclosure or partial enclosure that protects the components of circuit-board assembly 110. In an embodiment, as depicted in FIGS. 1-7, shell 106 includes apertures formed to receive each of arms 114. The body of shell 106 is likewise formed to receive center frame 112. Snap-fit components or tabs interface with frame assembly 102, and specifically, arms 114, as illustrated in FIG. 5, to secure shell 106 to frame assembly 102. Shell 106 can be made of plastic, metal, or other lightweight, yet durable material, such as a thermoplastic, and vacuum-formed into myriad shapes, as will be understood by one skilled in the art. In embodiments, shell 106 includes translucent or transparent windows for enhancing the visibility of LED output from circuit-board assembly 110. In other embodiments, shell 106 includes reflective surfaces on the inner portions for similarly enhancing the visibility of LED output.

Each of the plurality of motor assemblies 108 may generally comprise a motor 130, a propeller 132, an optional motor cover 134, and wiring 136. Motor 130 can be any electromechanical device that converts electrical energy into mechanical energy. In an embodiment, as illustrated, motor 130 comprises a cylindrical structure having outer edges that are slightly smaller than the inner edges of motor housing 118. In other embodiments, motor 130 can be any other desired structure shape. Of course, the corresponding support structures, such as motor housing 118, Y-arm 128, and arm 114 can also be adapted to support other motor 130 shapes.

Propeller 132 converts rotary motion to provide propulsive force. In an embodiment, as illustrated, propeller 132 is in a twisted airfoil shape. Other shapes are also considered, depending on the performance properties desired for the propeller 132 in terms of efficiency, thrust, attack angle and RPM. Propeller 132 can be made from plastic, metal, or other lightweight, yet durable material. In embodiments, propeller 132 can be smaller or bigger, and of different pitches. In some embodiments with four propellers 132, two propellers are designed for clockwise rotation and two propellers are designed for counter clockwise rotation. In other embodiments (not shown) the number of thrust elements comprised of an arm, motor and one or more propellers can be any number greater than two. In other embodiments, a pair of propellers, one facing downward and one facing upward, may be used for each motor and arm combination of a thrust element.

In some embodiments, motor cover 134 comprises a capped cylinder such that the cylinder is open on one end and adapted to receive motor 130 and a portion of Y-arm 128 and motor housing 118. Motor cover 134 is shaped slightly larger than motor 130, and more particularly, motor housing 118 such that the inner edges of motor cover 134 are slightly larger than the outer edges of motor housing 118. The motor cover 134 is adapted to be oversized or provide a structural channel to enclose and protect wiring 136 that extends from a top end of the motor 130 and are routed via the arms 114 to the center body 112. In certain embodiments, the open end of motor cover 134 can be shaped or cut out to conform to the opposite receiving end of the respective portions of Y-arm 128 and motor housing 118. Motor cover 134 is thus adapted to provide the snap-on fit of safety ring 104 to secure Y-arm 128 to motor housing 118 and arm 114. In some embodiments, motor cover 134 may be a solid cylindrical cover and in other embodiments, motor cover 134 may include slots or cutout sections in either or both the side and top walls of the motor cover 134. In other embodiments, motor housing 118 may be molded into arms 114, or motor 130 may be secured in position to arms 113 by other mechanical arrangements.

Wiring 136 comprises insulated conductors adapted to carry electricity for power and/or control. Wiring 136 operably couples the power source, such as battery 124, to motor 130 to provide the proper electrical signal to operate motor 130, and may optionally include control signal as part of the power signals, or may include separate control wires.

Similar to the safety problem discussed above with respect to safety ring 104, a common problem exists with respect to the motors 130 and propellers 132 in that they can be damaged by items in the flight path of the hovering remote-control flying craft 100. Further, problems exist in mounting the motor, effectively wiring the motor, and having structure proximate the propeller that creates inefficient airflow. In the prior art, motors are typically mounted by a holder on an end of a carbon-fiber rod that such that the propellers are upward-facing. In embodiments of the present invention, the motor assemblies 108 are mounted downward for improved efficiency. Motor housing 118 provides an easy manufacturing guide during assembly, as well as improves the ability of frame assembly 102 to absorb shock and vibration. Motor cover 134 not only protects wiring 136 from motor 130, but also aids in securing motor 130, and also improves the aesthetics of hovering remote-control flying craft 100.

Referring to FIGS. 10-13, circuit-board assembly 110 is depicted. Circuit-board assembly 110 generally comprises printed board 138 and electrical components gyroscope 140, accelerometer 142, magnetometer 144, microcontroller 146, LED 148, infrared receiver 150, radio 152, infrared transmitter 154 (e.g., an infrared laser), a plurality of motor connectors 156, and power connector 158.

Printed board 138 comprises a circuit board to mechanically support and electronically connect the aforementioned electronic components. Embodiments of printed board 138 therefore comprise layers of conducting material and insulating material. In some embodiments, printed board 138 comprises a unique tabbed design. The tabs of printed board 138 mechanically support the plurality of motor connectors 156, power connector 158, and radio 152, while the body of printed board 138 is left free to support the electronic components, which require relative proximity to each other due to the required electrical connections. In some embodiments, printed board 138 is operably coupleable to frame assembly 102, and specifically, center body 112 via fasteners 122, as shown in FIG. 6. In other embodiments, printed circuit board 138 is snap-fit into center body 112. The tabbed design of printed board 138 further aids in securing printed board 138 into center body 112. Embodiments of printed board 138 positioned and secured into center body 112 further provide structural support for the top member and bottom member of center body 112, as previously described, as well as each of arms 114.

Problems exist for printed boards of the prior art. Cost, extensive assembly time, board space limitations, and wireless-transmission design issues are all prevalent in conventional designs. Traditionally, power wiring is soldered directly to the circuit board. Further, wire-to-wire connectors are often utilized for battery connection to the circuit board, which all take up valuable space on the circuit board. In embodiments of the present invention, the printed board 138 comprises a plurality of tabs extending from the sides of the body of the printed board 138 that have plug in connectors 156 for power wires to motors 130. Additionally, in embodiments, a printed board 138 comprises a tab extending for the surface mount power connector 158 on the bottom side of printed board 138 and a tab on the opposite end of printed board 138 for radio 152. Such a tabbed printed board 138 design saves valuable retail space on the body of the printed board 138, enables efficient assembly, and allows for the effective transmission of wireless data.

Gyro 140 comprises a sensor or set of sensors for measuring the orientation or angular position of hovering remote-control flying craft 100. Gyro 140 comprises, in an embodiment, a 3-axis microelectromechanical (MEMS) gyro capable of measuring roll, pitch, and yaw. As illustrated, circuit-board assembly 110 comprises a single gyro 140 chip package for all three axes. In embodiments, additional gyros 140 or gyro chip packages can be utilized.

Accelerometer 142 comprises a sensor or set of sensors for measuring the acceleration relative to hovering remote-control flying craft 100. In an embodiment, accelerometer 142 is used to measure Earth's gravity as a reference for the "down" vector upon which errors in gyro 140 are estimated and removed. Accelerometer 142 comprises, in an embodiment, a MEMS accelerometer. As illustrated, circuit-board assembly 110 comprises a single 3-axis accelerometer 142. In embodiments, additional accelerometers 142 or accelerometers packages can be utilized.

Magnetometer 144 comprises a sensor or set of sensors for measuring the strength or direction of magnetic fields for compassing and dead reckoning of hovering remote-control flying craft 100. Magnetometer 144, in an embodiment, can also be used to measure the Earth's magnetic field to use as a static reference vector upon which the errors of the gyroscope 140 are estimated and removed. As illustrated, circuit-board assembly 110 comprises a single magnetometer 144. In embodiments, additional magnetometers 144 or magnetometer packages can be utilized.

Microcontroller 146 comprises an integrated circuit containing a processing core and memory, and is configured to receive input and promulgate output. Specifically, microcontroller 146 is configured to control motors 130. In an embodiment, the integrated circuit of microcontroller 146 comprises motor drivers 162 configured to interface with motors 130. In embodiments microcontroller 146 comprises machine-executable code for navigation, filtering, and compensation algorithms, among other guidance-based algorithms incorporating gyro 140, accelerometer 142, and/or magnetometers 144 inputs.

LED 148 comprises a semiconductor light source for lighting hovering remote-control flying craft 100. In embodiments, LED 148 is configured to illuminate in several different colors. Circuit-board assembly 110 can comprise a single LED 148. In other embodiments, multiple LEDs 148 can be utilized. In embodiments, LED 148 is selectable in response to RF signals from a controller.

Infrared receiver 150 comprises a receiver of infrared signals. As illustrated, circuit-board assembly 110 comprises a single infrared receiver 150. In embodiments, additional infrared receivers can be utilized.

Radio 152 comprises a radio transmitter for interfacing with other radios or devices configured to receive radio signals. In embodiments, radio 152 further comprises a radio receiver for interfacing with transmitted radio signals. As illustrated, circuit-board assembly 110 comprises a single radio 152. In embodiments, additional radios 152 can be utilized.

Infrared transmitter 154 comprises a transmitter of infrared signals. As illustrated, circuit board assembly 110 comprises a single infrared transmitter 154. In embodiments, additional infrared transmitters can be utilized. In embodiments, the functionalities of infrared receiver 150 and infrared transmitter 154 are combined into a single infrared transceiver (not shown).

Optionally, circuit-board assembly 110 can further comprise pairing button 155. As illustrated, a portion of pairing button 155 extends over the bounds of printed board 138 to provide an interface for activating pairing functionality, as will be described.

Referring generally to FIGS. 14-20, an embodiment of a one-handed controller 1000 for controlling hovering remote-control flying craft 100 is illustrated. Controller 1000 generally comprises a controller body 1020, a top hat assembly 1040, a trigger assembly 1060, and a circuit-board assembly 1080.

Controller body 1020 generally comprises a top housing 1100 and a bottom housing 1120. Top housing 1100 comprises a partial enclosure for the components of controller 1000 and generally includes a center wall 1140, side walls 1160, a top-hat aperture 1180, and an infrared cutaway 1200. Body 1020 or portions thereof can be made of molded plastic, including thermoplastics, thermosets, and elastomers, in embodiments.

In an embodiment, the lengthwise span of center wall 1140 is overall slightly curved or angled to form a pleasing tactile interface with the hand of a user as well as provide a reference indication. In embodiments, center wall 1140 comprises a plurality of sections angled relative to each other to create a slightly curved overall structure. A top surface of center wall 1140 is generally flat to provide a reference surface for the user. The flat top surface informs the user how to hold controller 1000 via the structure itself. Orientation of remote-control flying craft 100 controlled by controller 1000 relative to the flat surface is thereby expressed to the user. The opposing underneath surface can optionally comprise fastener receiving apertures adapted to assist in securing top housing 1100 and bottom housing 1120.

Side walls 1160 extend from center wall 1140 in a slightly curved manner to form a relative U-shape with center wall 1140 and thereby, partial walls of the enclosing structure of body 1020. In embodiments, the edges of side walls 1160 are slightly projected and adapted to couple to a corresponding lip aperture of bottom housing 1120. In operation, when gripped by a user, top housing 1100, and particularly, center wall 1140 and side walls 1160 generally interfaces with the palm of the user's hand. In embodiments, portions of center wall 1140 and/or portions of side walls 1160 can include cutaways to better conform to the hand of the user.

Figure 14:
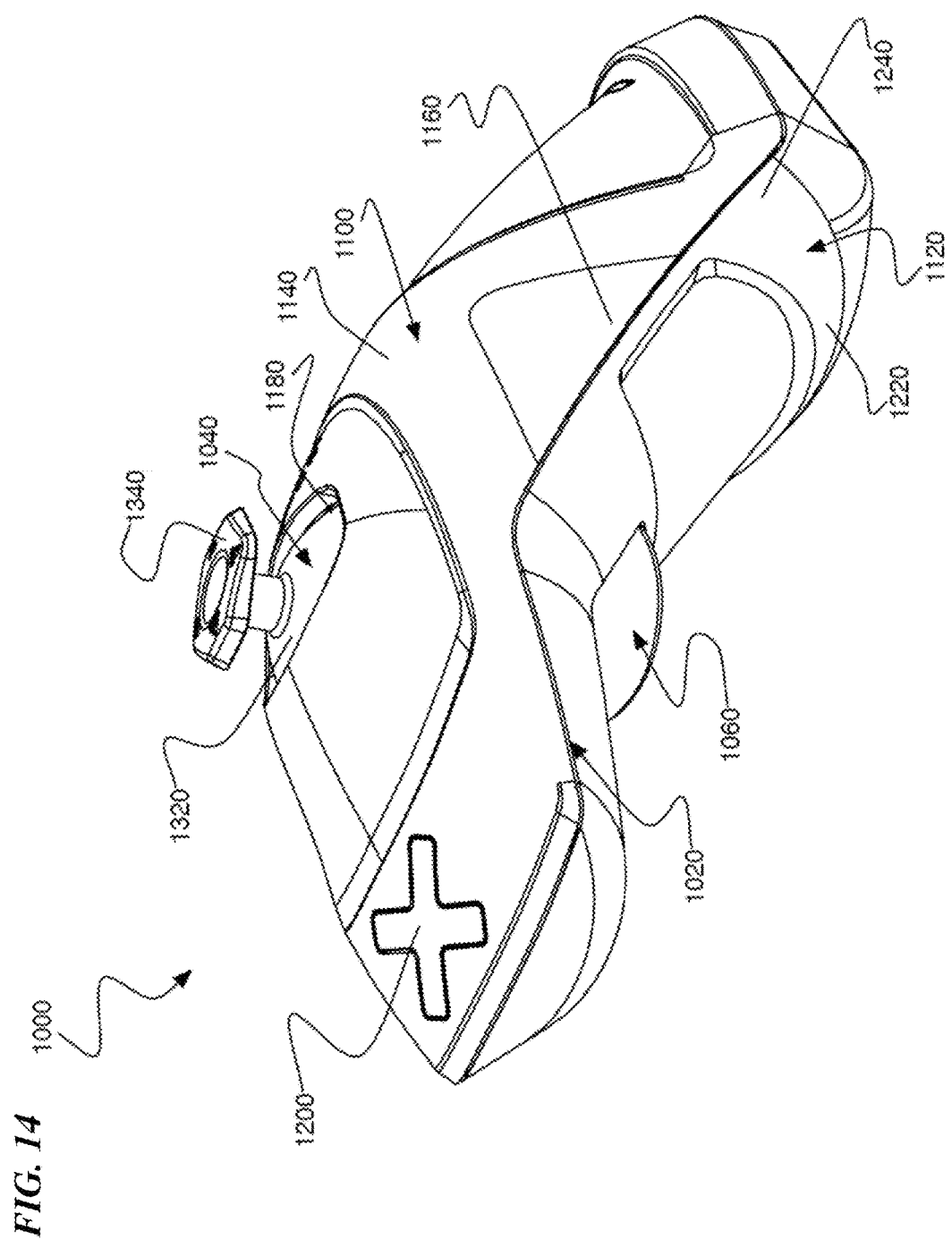
FIG. 14 is a side perspective view of a controller 1000 for a hovering remote-control flying craft, according to an embodiment.
Figure 15:
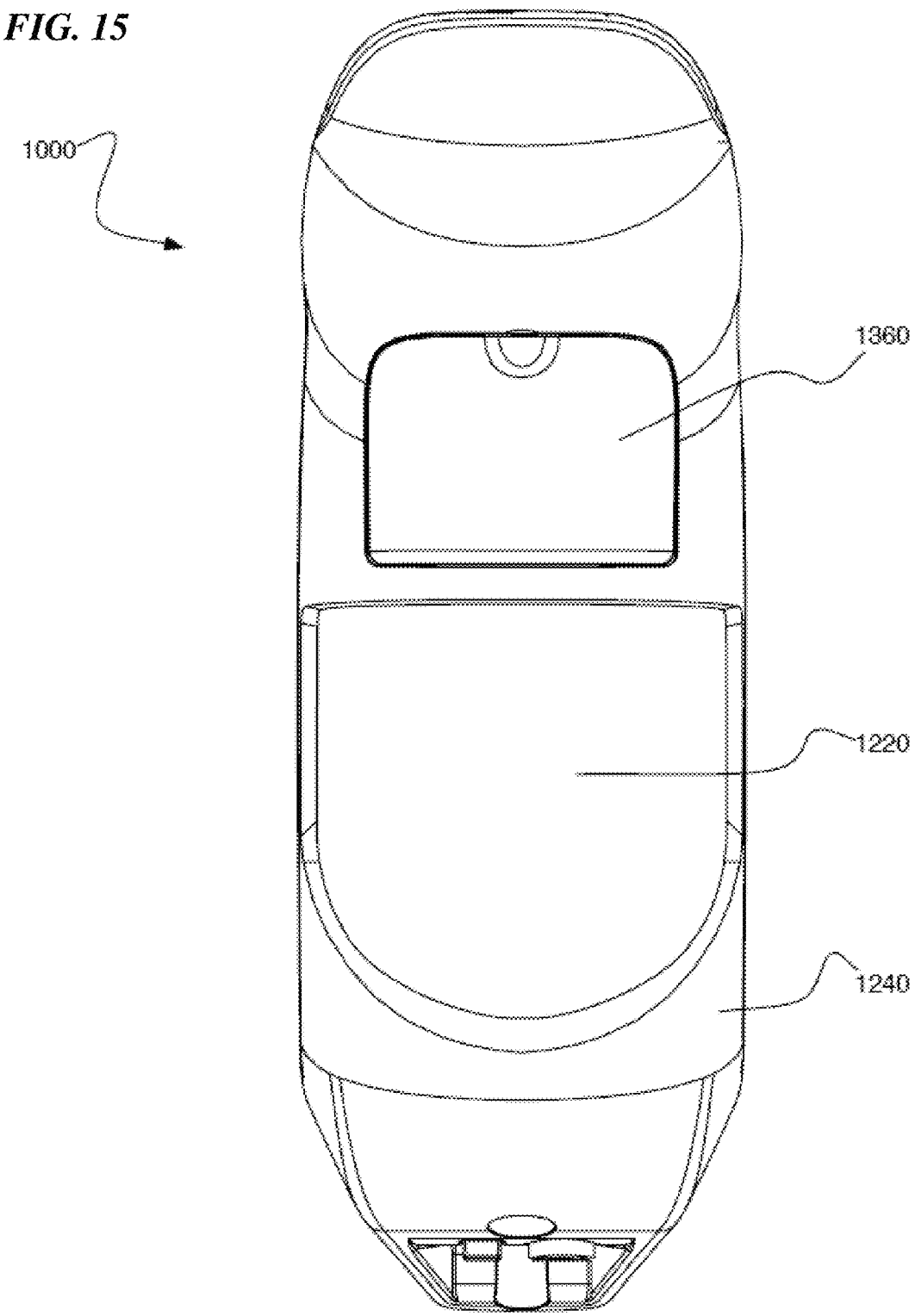
FIG. 15 is a bottom plan view of controller 1000 of FIG. 14, according to an embodiment.
Figure 16:
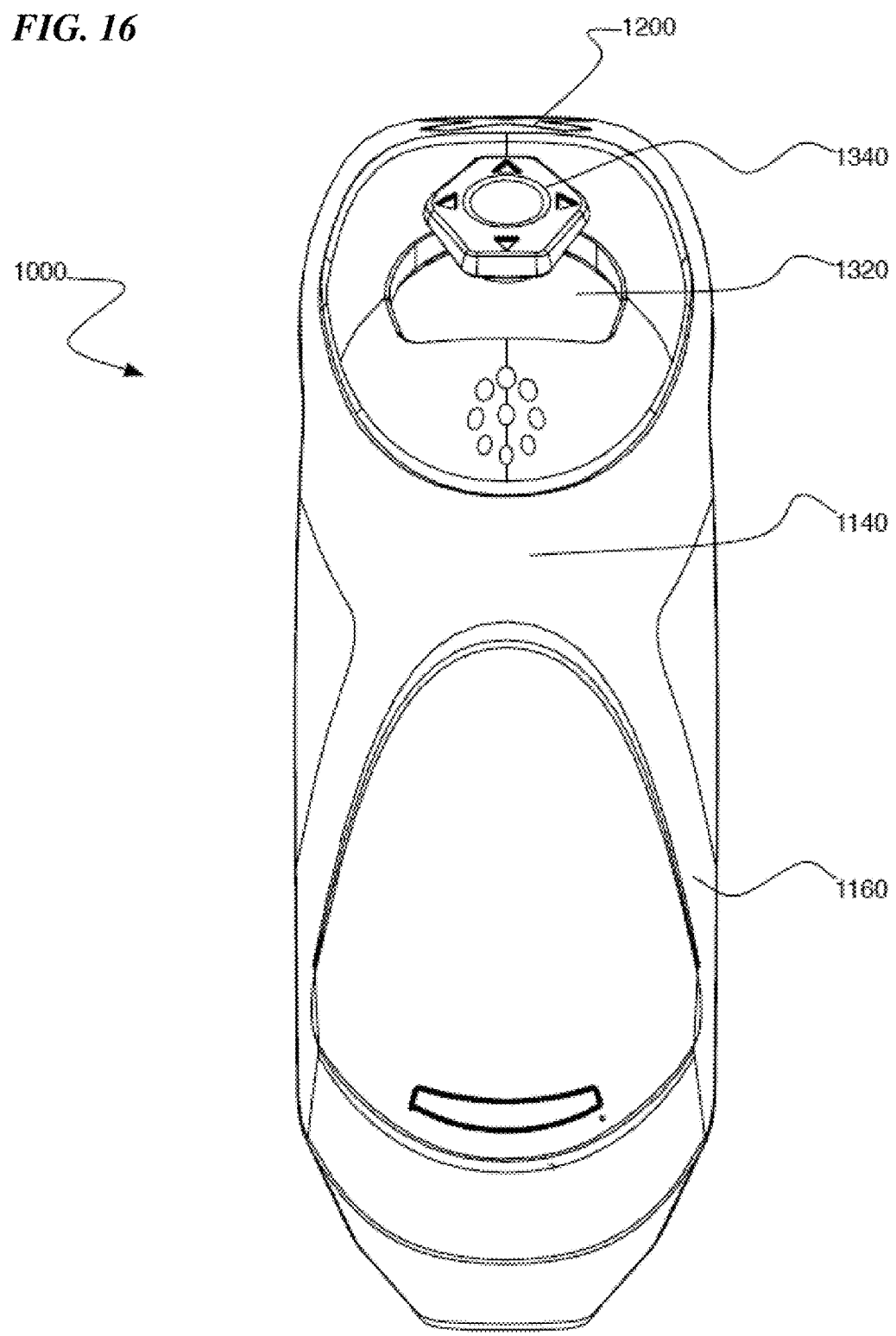
FIG. 16 is a top back plan view of controller 1000 of FIG. 14, according to an embodiment.
Figure 17:
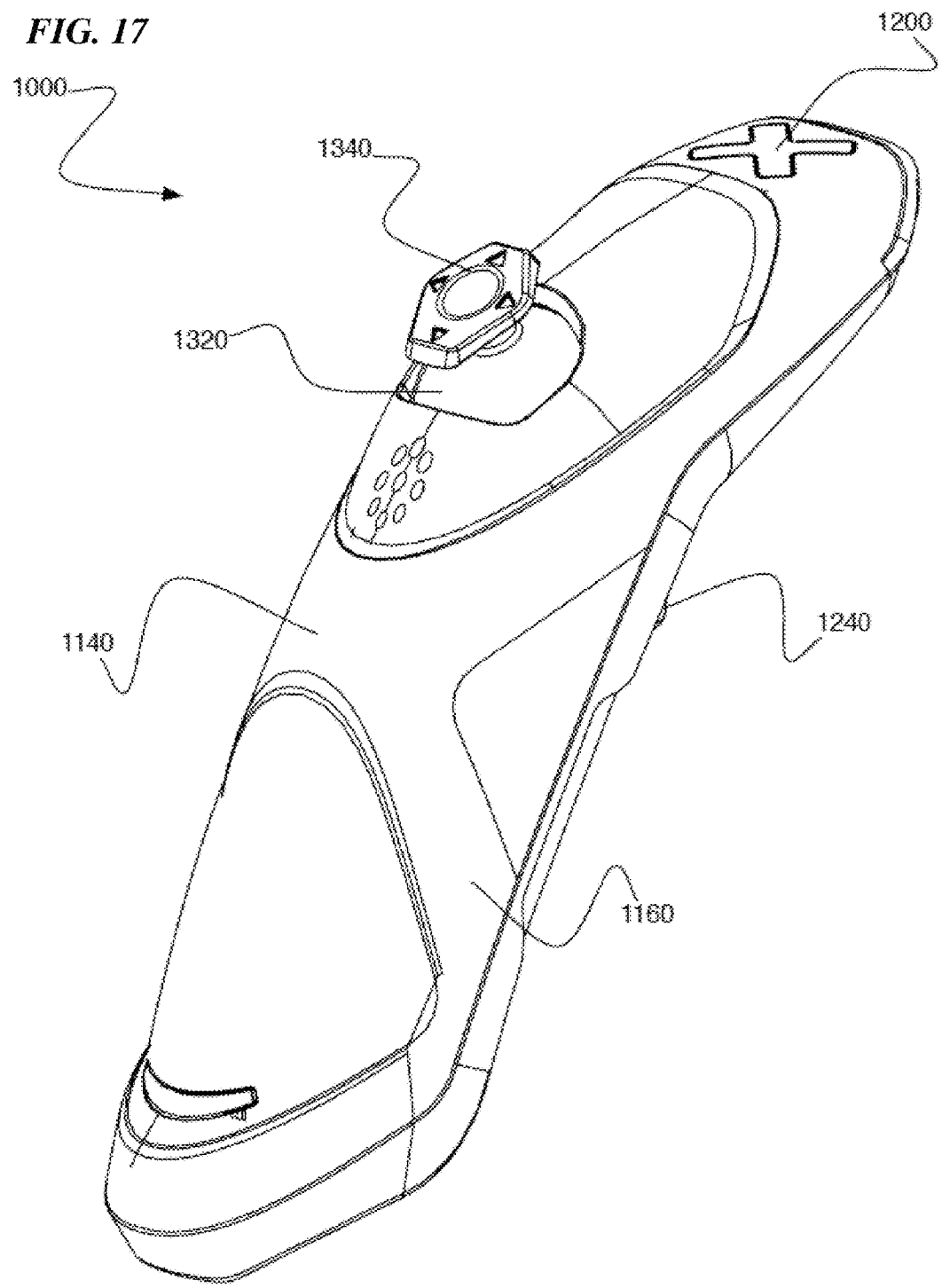
FIG. 17 is a side perspective view of controller 1000 of FIG. 14, according to an embodiment.
Figure 18:
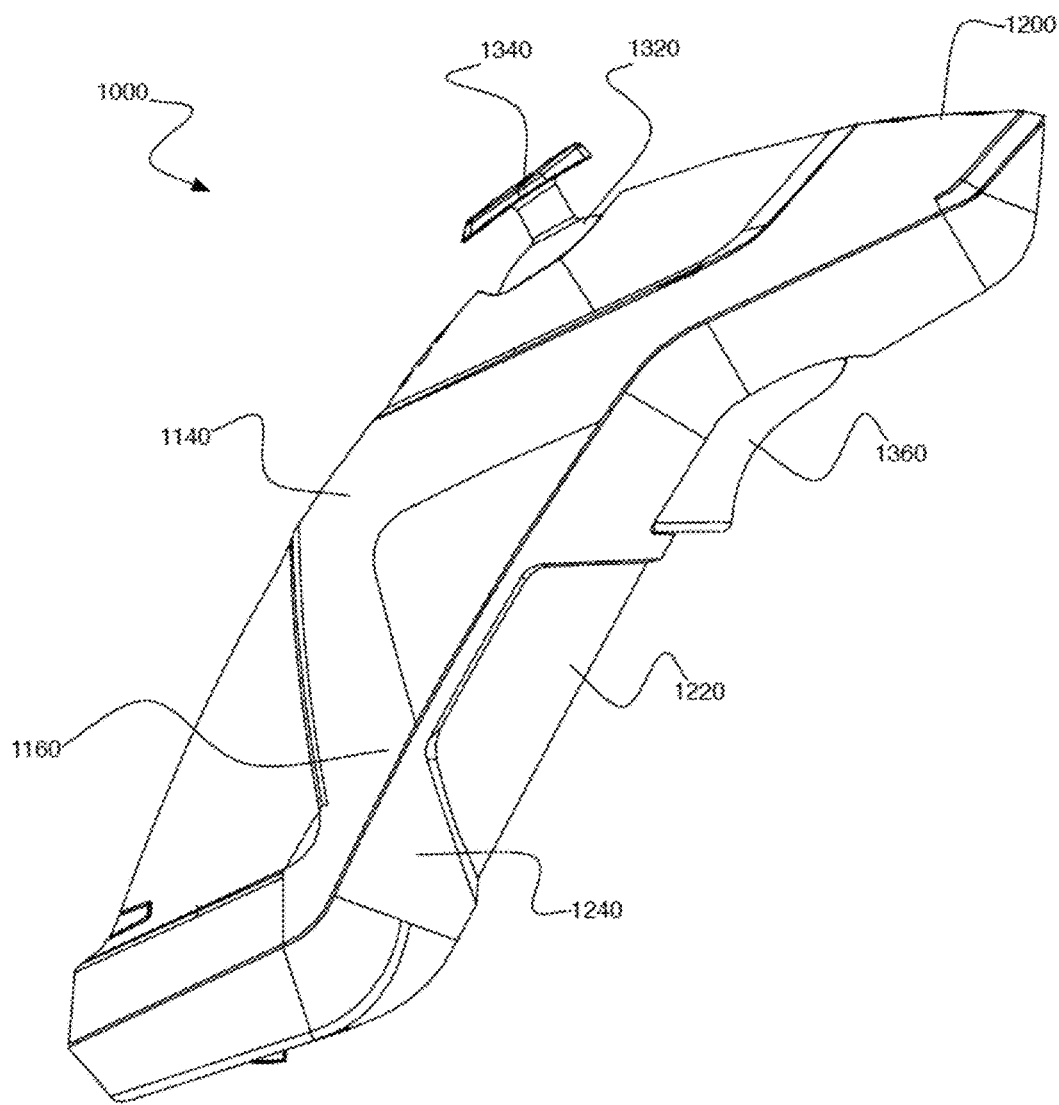
FIG. 18 is a right side view of controller 1000 of FIG. 14, according to an embodiment.
Figure 19:
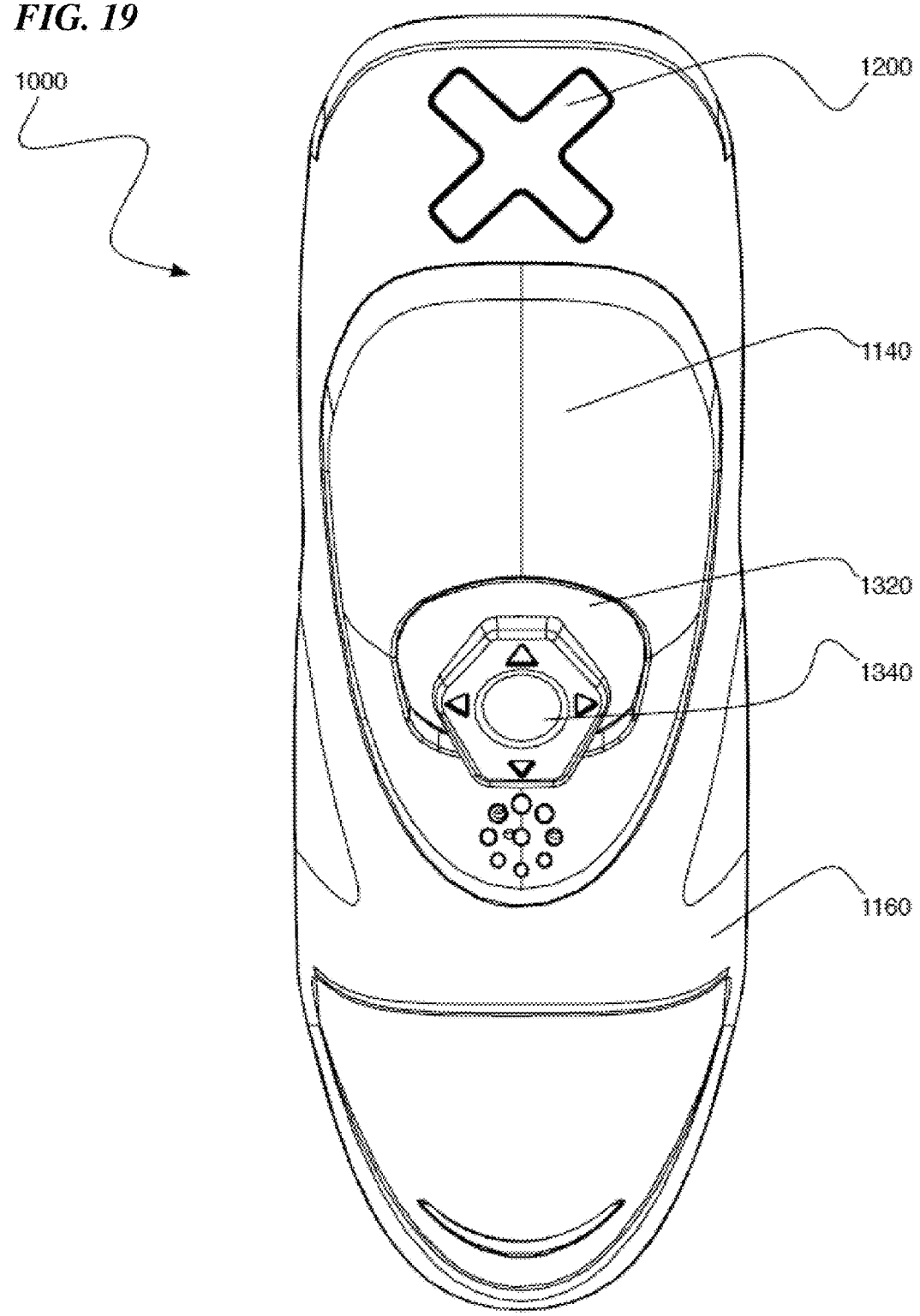
FIG. 19 is a top front plan view of controller 1000 of FIG. 14, according to an embodiment.

Top-hat aperture 1180 is provided within center wall 1140 and extends into portions of side walls 1160, in embodiments, to allow top-hat assembly 1040 to project above top housing 1100 when controller 1000 is assembled, as illustrated, for example, in FIG. 14. Top-hat aperture 1180 is positioned in the relative "front" of top housing 1100 distal the "back" end of top housing 1100 that interfaces with the palm of the user. Top-hat aperture 1180 is large enough to allow full motion of top-hat assembly 1040, as will be described.

Infrared cutaway 1200 is provided proximate top-hat aperture 1180 within center wall 1140 and extending into portions of side walls 1106, in embodiments, to allow targeted infrared communication with other devices, for example, remote-control flying craft 100. As illustrated, infrared cutaway 1200 is substantially X-shaped, but can be other shapes or sizes, depending on the embodiment. Further, infrared cutaway 1200 can be covered with transparent or translucent material to enable the display of light-emitting diode (LED) coloring via components of circuit-board assembly 1080.

In embodiments, a pair of one hovering flying craft 100 and one handheld controller 1000 are selectively associated with each other and both craft 100 and controller 1000 of the pair each include at least one multi-color LED configured to display a common selectable color that is the same for both craft 100 and the controller 1000 and indicates a team to which the pair of the craft 100 and controller 1000 are assigned for purposes of playing multiplayer team games.

Bottom housing 1120 comprises the opposing structure to top housing 1100 for the enclosure of the components of controller 1000. Bottom housing 1120 generally includes a center wall 1220, side walls 1240, trigger aperture 1260, and internal supporting structure 1280. Optionally, bottom housing 1120 can further comprise fastener apertures.

Figure 20:
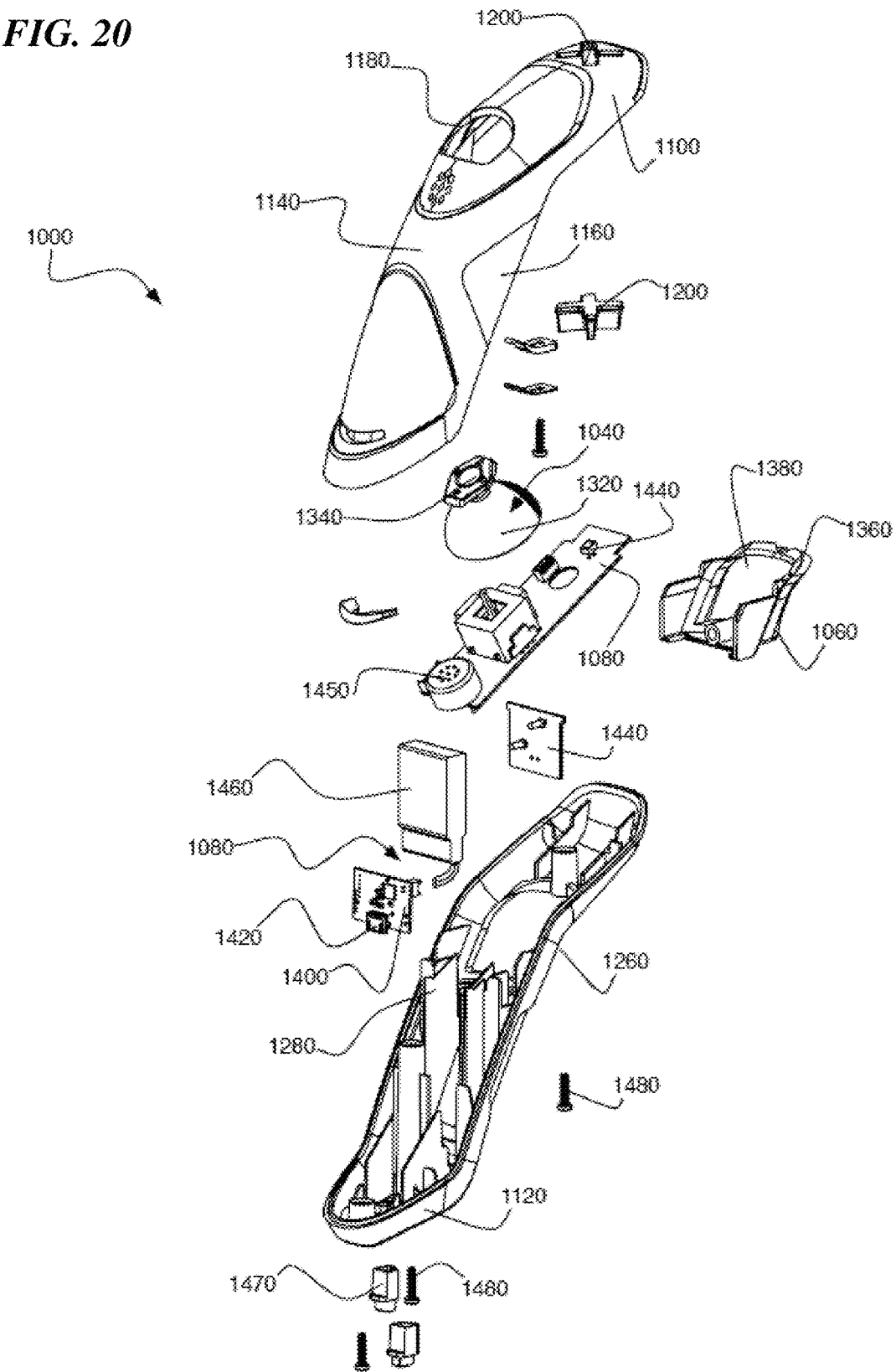
FIG. 20 is an exploded side view of controller 1000 of FIG. 14, according to an embodiment.

In an embodiment, the lengthwise span of center wall 1220 is overall slightly curved or angled to form a pleasing tactile interface with the hand of a user. In embodiments, center wall 1220 comprises a plurality of sections angled relative to each other to create a slightly curved overall structure, as illustrated in FIG. 20, mirroring that of top housing 1100.

Side walls 1240 extend from center wall 1220 in a slightly curved manner to form a relative U-shape with center wall 1220 and thereby, partial walls of the enclosing structure of body 1020. A receiving lip is formed along the edges of side walls 1240 of bottom housing 1120 in order to create a tight interface to top housing 1100, and particularly, the projecting lip of side walls 1160. When gripped by a user, bottom housing 1120 generally interfaces with the fingers of the user's hand. In embodiments, portions of center wall 1220 and/or portions of side walls 1240 can include cutaways to better conform to the hand of the user.

Trigger aperture 1260 is provided within center wall 1220 and extends into portions of side walls 1240 in embodiments, to allow trigger assembly 1060 to project through bottom housing 1120 when controller 1000 is assembled, as illustrated, for example, in FIG. 14. Trigger aperture 1260 is shaped similarly to trigger assembly 1060 but slightly larger than trigger assembly 1060; for example in a rectangle having rounded corners. Trigger aperture 1260 is positioned in bottom housing 1120 proximate the relative positioning of top-hat aperture 1180 in top housing 1100, that is, near where the forefinger or trigger finger can comfortably grip trigger assembly 1060 when the user grips body 1020.

Supporting structure 1280 is provided within bottom housing 1120 for supporting and mounting a circuit-board assembly 1080 and related components. Supporting structure 1280 can comprise a series of rails or an enclosed frame. As illustrated in FIG. 20, portions of circuit-board assembly 1080 can be slid into place, as will be described, to securely lock and position the operational electronic components.

Top-hat assembly 1040 generally includes a base 1320 and a top hat 1340. Base 1320, as illustrated, can comprise a half-dome shape. Base 1320 can be rounded or flat, but is angled such that top hat 1340 can be maneuvered around the shape of base 1320 with a full range of motion. Base 1320 is secured to portions of bottom housing 1120 proximate the relative location of top hat aperture 1180 when top housing 1100 is coupled to bottom housing 1120. A portion of base 1320 can thereby project above the plane of top housing 1100 to allow full range of motion of top hat 1340.

Top hat 1340 extends from base 1320 to provide a tactile interface for the thumb of the user to further control remote-control flying craft 100. Top hat 1340 can comprise any number of shapes, but preferably includes a flat top surface and one or more angled side surfaces. For example, referring to FIGS. 16-18, top hat 1340 comprises a rounded hexagon. The flat top surface can be textured to further provide additional grip for the thumb of the user.

Trigger assembly 1060 generally includes finger interface 1360 and actuating structure 1380. Finger interface 1360 comprises a generally rectangular body having a rounded crescent side for directly and comfortably contacting the finger of the user. When trigger assembly 1060 is assembled to body 1020, finger interface 1360 projects outside of body 1020. Actuating structure 1380 is operably coupled to finger interface 1360 and is coupled inside of body 1020. Actuating structure 1380 provides a resilient spring-like feel to finger interface 1360, and can be constructed via components known in the art such as mechanical components such as springs, pneumatic actuators, or electric actuators, for example. Due to the angle of trigger assembly 1060 relative to body 1020, components of actuating structure 1380 can be coupled to top housing 1100 and/or bottom housing 1120, in various embodiments. In various embodiments, circuit-board assembly 1080 provides a stiff backing wall for trigger assembly 1060.

Circuit-board assembly 1080 generally comprises a printed board 1400 and electrical components an accelerometer (not shown), a magnetometer (not shown), a microcontroller 1420, an LED 1440, an infrared receiver (not shown), a radio (not shown), and an infrared transmitter (not shown).

Printed board 1400 comprises a board to mechanically support and electronically connect the aforementioned electronic components. Embodiments of printed board 1400 therefore comprise layers of conducting material and insulating material. Printed board 1400 comprises a unique tabbed design. The body of printed board 1400 supports the electronic components, which require relative proximity to each other due to the required electrical connections. Printed board 1400 can be operably coupled to supporting structure 1280 via fasteners. In other embodiments, printed board 1400 is snap-fit into supporting structure 1280.

The accelerometer comprises a sensor or set of sensors for measuring the acceleration of controller 1000. Accelerometer comprises, in an embodiment, a MEMS accelerometer. In an embodiment, circuit-board assembly 1080 comprises a single accelerometer. In embodiments, additional accelerometers or accelerometers packages can be utilized.

The magnetometer comprises a sensor or set of sensors for measuring the strength or direction of magnetic fields for compassing and dead reckoning of controller 1000. In an embodiment, circuit board assembly 1080 comprises a single magnetometer. In embodiments, additional magnetometers or magnetometer packages can be utilized.

Microcontroller 1420 comprises an integrated circuit containing a processing core and memory, and is configured to receive input and promulgate output. Specifically, microcontroller 1420 is configured to sample data from the gyros and accelerometers. In an embodiment, the integrated circuit of microcontroller 1420 comprises machine-executable code for interfacing with remote-control flying craft 100 under control by controller 1000.

LED 1440 comprises a semiconductor light source for lighting controller 1000. In embodiments, LED 1440 is configured to illuminate in several different colors. Circuit-board assembly 1080 can comprise a discrete LED board, in embodiments. Further, LED 1440 can comprise a single LED 1440. In other embodiments, multiple LEDs 1440 can be utilized. Team play can thereby be facilitated, by providing a uniform color to each controller 1000 for a particular team.

The infrared receiver comprises a receiver of infrared signals. In an embodiment, circuit-board assembly 1080 comprises a single infrared receiver. In embodiments, additional infrared receivers can be utilized.

The radio comprises a radio transmitter for interfacing with other radios or devices configured to receive radio signals. In embodiments, radio further comprises a radio receiver for interfacing with transmitted radio signals. In an embodiment, circuit-board assembly 1080 comprises a single radio. In embodiments, additional radios can be utilized.

The infrared transmitter comprises a transmitter of infrared signals. In an embodiment, circuit-board assembly 1080 comprises a single infrared transmitter. In embodiments, additional infrared transmitters can be utilized. In embodiments, the functionalities of the infrared receiver and the infrared transmitter are combined into a single infrared transceiver (not shown).

In embodiments, controller 1000 can further comprise a gyro package. The gyro package can comprise a sensor or set of sensors for measuring the orientation or angular position of controller 1000. The gyro comprises, in an embodiment, a 3-axis microelectromechanical (MEMS) gyro capable of measuring roll, pitch, and yaw. In an embodiment, circuit-board assembly 1080 comprises a single gyro package for all three axes. In embodiments, additional gyros or gyro packages can be utilized, or no gyros can be used, in other embodiments.

In embodiments, controller 1000 further comprises rechargeable battery 1460 configured to power the aforementioned electrical components. In embodiments, controller 1000 further comprises a USB connection (not shown) adapted to receive a standard USB cable. The opposite end of the USB cable can be connected to a computer, wall outlet, or other power source, in order to recharge rechargeable battery 1460. In embodiments, the USB connection further interfaces with components of circuit board assembly 1080.

In embodiments, controller 1000 further comprises a vibrator motor (not shown). The vibrator motor can provide real-time feedback to the user during operation of the controlled remote-control flying craft 100. For example, obstructions encountered by remote-control flying craft 100 can be relayed to the user via vibrations. In embodiments, warnings or status can likewise be vibrated to the user.

In embodiments, controller 1000 further comprises a speaker 1450. The speaker 1450 can provide real-time feedback to the user during operation of the controlled remote-control flying craft 100. For example, obstructions encountered by remote-control flying craft 100 can be relayed to the user via sounds and/or spoken words. In various embodiments, warnings or status can likewise be communicated to the user by sound.

Optionally, controller 1000 can include a pairing button 1470. A problem exists when many RF devices are within RF range of each other. In the prior art, the devices are similarly forced to use different "channels" implemented by different radio frequencies. In additional embodiments of controller 100, the frequency-agile radio can support "pairing" via a push button or pairing key. Myriad RF communication possibilities thus exist, and are not limited to a finite number of pre-programmed "channels."

Fasteners 1480, as depicted in FIG. 20, can be positioned through bottom housing 1120, and specifically, fastener apertures, and into top housing 1100, and specifically, fastener receiving apertures in order to operably couple top housing 1100 and bottom housing 1120 to assemble controller 1000.

In embodiments, controller 1000 microcontroller comprises operation code for control sequences for changing craft from novice to expert mode. A series of signals sent from controller 1000, for example, via top hat 1340, can activate code inside the microcontroller to toggle modes. Novice mode provides a throttling or limiting filter on data collected from controller 1000 for implementation by remote-control flying craft 100. In other words, any large magnitude motion or movement is scaled back as interpreted movement to remote-control flying craft 100. In contrast, expert mode provides no filter or throttling; the user is free to operate remote-control flying craft 100 to its limits.

During game play, trigger assembly 1060 can be used. Specifically, the forefinger of the user can interface with finger interface 1360 and become depressed via actuating structure 1380. In this way, shooting games such as those using air-to-air or air-to-ground targets, as well other directional transmission games such as capture the flag, elimination, domination, and tag can be implemented.

In embodiments of controller 1000 used for game play, the infrared transmitter and infrared receiver can be configured for aerial game play with team selection capabilities. A problem exists in selecting and maintaining teams with aerial game play where there are a plurality of players and teams. This problem is further exacerbated by the close proximity of several transmitters and receivers, which can result in jamming. In the prior art, devices on separate sides are forced to use different "channels" implemented by different IR frequencies. Such a solution provides very limited game play options. Embodiments of the present invention feature code transmission with a simple code unique to the craft's team. The craft can thereby ignore codes for other teams. Additional or multiple teams can then be easily created, resulting in much greater range of game-playing options.

Figure 21:
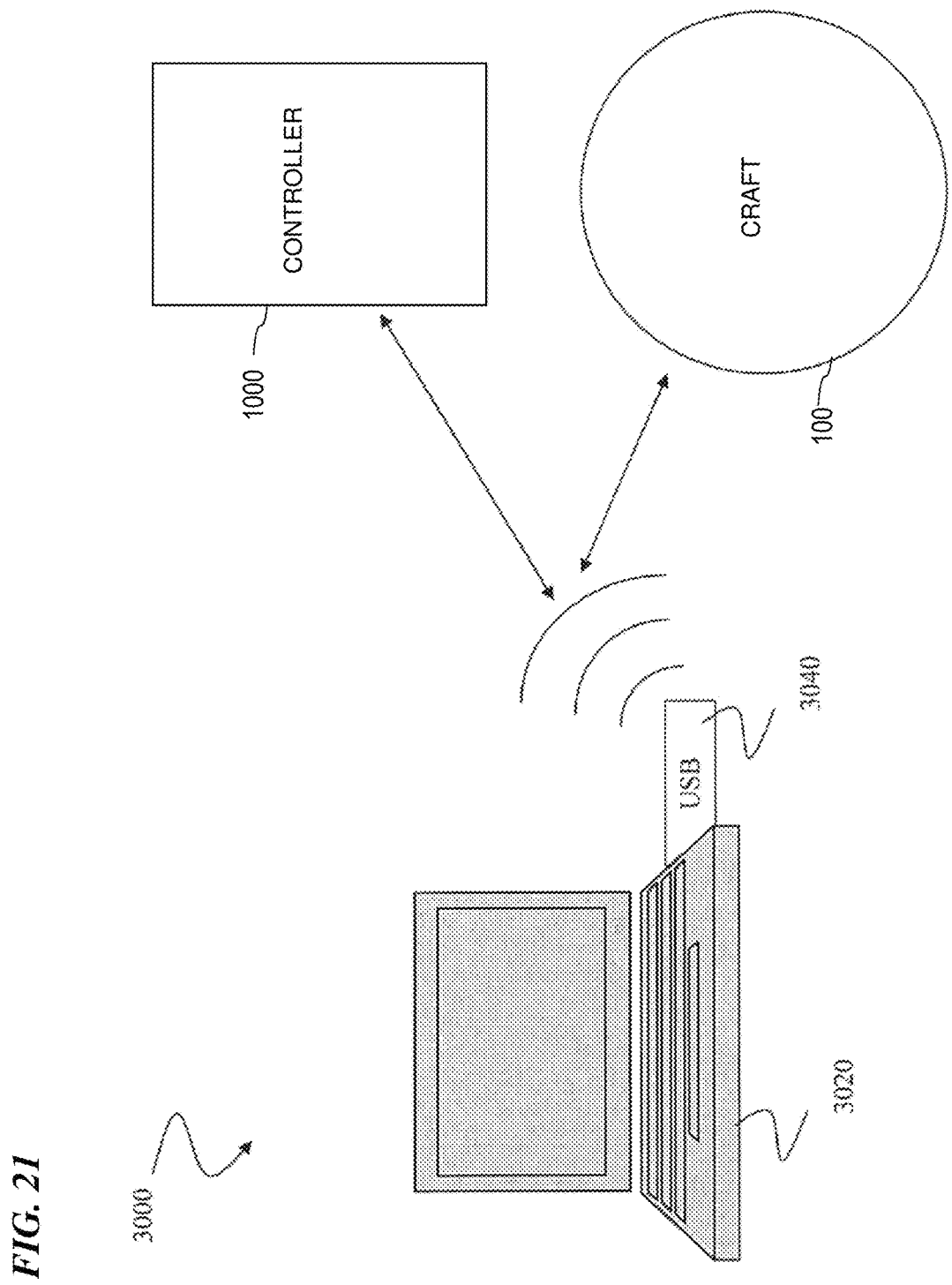
FIG. 21 is a block diagram of a system for reprogramming a controller and an associated hovering remote-control flying craft, according to an embodiment.

Referring to FIG. 21, a system 3000 for reprogramming a controller 1000 and a remote-control flying craft 100 controlled by controller 1000 is illustrated. System 3000 comprises a computing device 3020, a wireless interface 3040, and of course, the aforementioned controller 1000 and remote-control flying craft 100.

Computing device 3020 can include a desktop or laptop computer configured to download controller 1000 and/or remote-control flying craft 100 operating code. Computing device 3020 is further adapted to package the operating code in the protocols and messages prescribed by the controller 1000 and remote-control flying craft 100 interfaces.

Wireless interface 3040 comprises an interface over which operating code programming signals can be transmitted. In an embodiment, wireless interface 3040 comprises a USB dongle, as illustrated in FIG. 21. In other embodiments, wireless interface 3040 comprises Bluetooth, WIFI, or any other wireless transmission protocol.

To reprogram a controller 1000 and remote-control flying craft 100, computing device activates wireless interface 3040. Wireless signals are transmitted to controller 1000 and remote-control flying craft 100, either in combination or serially, with new operational code, which is received by the corresponding antenna of each controller 1000 and remote control flying craft 100. Wireless reprogramming can be done in this way due to the functionality of the controller 1000 radio and microcontroller. The controller 1000 radio, in embodiments, includes its own microcontroller for reset. Therefore, the radio firmware exists during reprogramming, despite the resetting of the other operational code.

In flight operation, the user grips, via one-handed operation, body 1020 of controller 1000. Preferably, the user grips body 1020 approximately in the center of body 1020, near the angle of top housing 1100 and bottom housing 1120, with the palm of the user interfacing to top housing 1100 and the fingers of the user interfacing to bottom housing 1120. The user's fingers can comfortably wrap around the curved sides of bottom housing 1120 to touch or slightly interface with the sides of top housing 1100, depending on the size of the user's hand. The grip ideally is placed such that the thumb of the user comfortably reaches the center of top hat 1340.

Controller 1000 is synched or paired with remote control flying craft 100 to activate remote control flying craft 100 relative to controller 1000. The user can then motion, with one hand via controller 1000, forward, backward, left, or right to subsequently direct remote control flying craft 100. Thrust and yaw are controlled through top hat assembly 1040. Specifically, top hat 1340 is directed around base 1320 by the user's thumb. Top hat 1340 is magnitude sensitive such that additional force on top hat 1340 creates additional thrust of remote control flying craft 100.

Sensors within controller 1000 are sampled and this data output from controller 1000 and transmitted to hovering remote control flying craft 100 via the radio of controller 1000 and received by radio 152. The user's operational signals are transmitted to microcontroller 146 in the form of the interface control protocol. Referring again to FIG. 13, gyro 140, accelerometer 142, and magnetometer 144 sensor readings are input into microcontroller 146. Based on the sensed data and control instructions, microcontroller 146 can, via motor driver 162, control the individual motors 130 in order to navigate hovering remote control flying craft 100 by mimicking the motion of controller 162.

In embodiments, various predefined maneuvers for craft 100 can be implemented by special or a particular sequence of commands from controller 1000. For example, a "flip" mode can be commanded to craft 100 by holding trigger assembly 1060 for longer than a defined period of time, while simultaneously tilting controller 1000 in the direction of the desired flip. In an embodiment, the period of time can be 1-5 seconds, for example. Code is subsequently sent by controller 1000 to craft 100 to implement the flip in the direction of the controller 1000.

Other maneuvers can also be implemented; for example, a pursuit curve, oblique turn, vertical turn, displacement roll, flat scissors, rolling scissors, barrel roll, yo-yo, or lag roll. Additionally, combinations of particular maneuvers can also be implemented based on a sequence of controller 1000 commands. In an embodiment, controller 1000 can command a leftward flip followed by an oblique turn by a trigger assembly 1060 hold for 1-5 seconds with movement of controller 1000 leftward followed by a trigger assembly 1060 hold for 1-5 seconds with movement of controller 1000 downward. Myriad combinations of maneuvers are considered.

Further, microcontroller 146 can illuminate LEDs 148, depending on the particular application and desire of the user; for example, during game play. Additionally, microcontroller 146 can transmit data via radio 152. Infrared receiver 150 can input data to microcontroller 146. Likewise, microcontroller 146 can command infrared transmitter 154 to output IR data, depending on the application.

In embodiments of hovering remote control flying craft 100 used for game play, infrared transmitter 154 and infrared receiver 150 can be configured for aerial game play with team selection capabilities. A problem exists in selecting and maintaining teams with aerial game play where there are a plurality of players and teams. This problem is further exacerbated by the close proximity of several transmitters and receivers, which can result in jamming. In the prior art, devices on separate sides are forced to use different "channels" implemented by different IR frequencies. Such a solution provides very limited game play options. Embodiments of the present invention feature code transmission with a simple code unique to the device's team. The device can thereby ignore codes for other teams. Additional or multiple teams can then be easily created, resulting in much greater range of game-playing options.

A similar problem exists when many devices are within RF range of each other. In the prior art, the devices are similarly forced to use different "channels" implemented by different radio frequencies. In additional embodiments of hovering remote control flying craft 100, the frequency-agile radio 152 can support "pairing" via a push button or pairing key. Myriad RF communication possibilities thus exist, and are not limited to a finite number of pre-programmed "channels." For example, referring again to FIGS. 10 and 12, pairing button 155 can enable this functionality.

In some embodiments, the present invention provides a hovering flying craft adapted to be controlled by a handheld remote control, the craft including a molded frame assembly including a center body formed of a top member having at least three arms integrally molded with and extending outwardly from the center body and a bottom member having at least three legs integrally molded with and extending downwardly from the center body; at least three motor assemblies that each include an electromechanical motor and at least one corresponding propeller operably mounted downwardly-facing, with at least one motor assembly operably mounted at a distal portion of each of the at least three arms; a circuit board assembly operably mounted to the center body and configured to control the craft in response to radio frequency signals from the handheld remote control, and a replaceable rechargeable battery insertable into a battery compartment defined by the top member and the bottom member and operably connectable to electrically power the circuit board assembly and the at least three motor assemblies.

In some embodiments of the craft, the circuit board assembly is positioned and secured in the center body to provide structural support for the top member and the arms of the molded frame assembly. In some embodiments, the circuit board assembly includes a printed board having a plurality of tabs that extend outwardly from a central surface structure adapted to support circuit board assembly components, including a gyroscope, an accelerometer, a magnetometer, a microcontroller, and a radio. In some embodiments, the plurality of tabs include a tab having a power connector for the rechargeable battery, a tab having a radio frequency antenna for the radio, and a tab having both an infrared emitter and an infrared receiver.

In some embodiments, the craft further includes at least one multi-color LED operably connected to the circuit board assembly and configured to display a selectable color in response to frequency signals from the handheld remote control. In some embodiments, the craft further includes a removable safety ring mountable to and extending from the distal portion of the arms and configured to protect the propellers from lateral contact. In some embodiments, each of the motor assemblies includes a motor cover that is configured to secure the motor to the arm by a snap fit. In some embodiments, the arms are formed of an injectable molded plastic having a durometer greater than 70 Shore D and the legs are formed of an injectable molded plastic having a durometer less than 60 Shore D.

In some embodiments of the craft, the center body is formed of a two-piece structure that sandwiches the circuit board assembly to provide structural support for the molded frame assembly. In some embodiments, the craft further includes a removable safety ring that protects the propellers from lateral contact and includes an outer ring supported by a plurality of Y-arms that are each adapted to correspond to and interface with a corresponding one of the at least three arms. In some embodiments, at least one of the at least three motor assemblies includes a second propeller operably mounted upwardly-facing, in addition to the at least one propeller operably mounted downwardly-facing.

In some embodiments, the present invention provides a hovering flying craft system or kit that includes a hovering flying craft including: a frame assembly including a center body having at least three arms extending outwardly from the center body; at least three motor assemblies that each include an electromechanical motor and at least one corresponding propeller mounted at a distal portion of each arm; a circuit board assembly operably mounted to the center body and configured to control the craft in response to radio frequency signals and to control an infrared emitter and an infrared receiver; and a replaceable rechargeable battery insertable into the frame assembly and operably connectable to electrically power the circuit board assembly and the at least three motor assemblies; and a handheld controller configured to allow a user to control the hovering flying craft by providing inputs for an intended pitch and attitude of the hovering flying craft, and a thrust and yaw of the hovering flying craft, the controller including: a trigger assembly adapted to be manipulated by a finger of the user to provide the user with a control for sending commands to control at least the infrared emitter on the hovering flying craft; a control processor configured to provide control signals to a radio that generates the radio frequency signals for communication to and control of the hovering flying craft and the infrared emitter; and a battery to electrically power the handheld controller.

In some embodiments of the system or kit, the handheld controller is a one-handed controller including: a controller body adapted to be gripped by a single hand of a user and manipulated in space by the user to control the hovering flying craft, the controller body including a flat top reference surface to provide the user with a visual reference for an intended pitch and attitude of the hovering flying craft; a top hat controller adapted to be manipulated by a thumb of the single hand of the user to provide the user with a control for a thrust and yaw of the hovering flying craft; and at least one sensor configured to sense motion of the controller body as manipulated in space by the user. In some embodiments, the battery is a rechargeable battery mounted within the controller body to electrically power the handheld controller. In some embodiments, a pair of one hovering flying craft and one handheld controller are selectively associated with each other and both the craft and controller of the pair each include at least one multi-color LED configured to display a common selectable color that is the same for both the craft and the controller and indicates a team to which the pair of the craft and controller are assigned for purposes of playing multiplayer team games. In some embodiments, the circuit board assembly is operably mounted to the center body by a snap fit. In some embodiments, the center body is formed of a two-piece structure that sandwiches the circuit board assembly to provide structural support for the frame assembly.

In some embodiments, the present invention provides a system for wirelessly reprogramming a hovering flying craft and a handheld controller, the hovering flying craft adapted to be controlled by the handheld controller, the system including a hovering flying craft including a craft processor and a craft radio, the craft radio comprising a craft radio processor; a handheld controller including a controller processor and a controller radio, the controller radio comprising a controller radio processor; a computing device including a computing device processor and computing device memory, wherein the computing device processor is configured to: store craft operating code in the computing device memory, store controller operating code in the computing device memory, package the craft operating code according to the protocol of the craft radio, and package the controller operating code according to the protocol of the controller radio; and a wireless interface adapted to transmit the packaged craft operating code from the computing device to the craft radio and the packaged controller operating code from the computing device to the controller radio, wherein the craft operating code is programmed within the craft processor by the craft radio processor, and the controller operating code is programmed within the controller processor by the controller radio processor after transmission of the craft operating code and the controller operating code along the wireless interface.

In some embodiments of the system, the wireless interface is provided by one of a USB dongle, Bluetooth, or WIFI. In some embodiments, the craft operating code is transmitted from the computing device to the craft radio and the controller operating code is transmitted from the computing device to the controller radio serially or at an overlapping time.

In some embodiments, the present invention provides a hovering flying craft adapted to be controlled by a handheld remote control, the craft including a molded frame assembly including a plurality of arms extending from a center body; a plurality of downward-facing motor assemblies, each including a motor, a propeller, and a motor cover, and located at the interface of each of the arms and the Y-arms extending therefrom, the motor cover configured to snap-fit secure an individual Y-arm and an individual arm; and a tabbed circuit board assembly operably coupleable to the center body and configured to control the plurality motor assemblies based on radio frequency signals from the handheld remote control.

In some embodiments of the craft, the center body is formed of a two-piece structure that sandwiches the circuit board assembly to provide structural support for the molded frame assembly. In some embodiments, the circuit board assembly includes a plurality of tabs that are adapted to support mounting of wire connectors, and provide surface structure on which a radio frequency antenna is constructed and emitters for both an infrared emitter and an infrared receiver. In some embodiments, the craft further includes a removable safety ring that protects the propellers from lateral contact and includes an outer ring supported by a plurality of Y-arms that are each adapted to correspond to and interface with a corresponding one of the plurality of arms.

In some embodiments, the present invention provides a method that includes providing a molded frame assembly including a plurality of arms extending from a center body; locating a plurality of downward-facing motor assemblies, each including a motor and a propeller and a motor cover, at an interface of each of the arms and Y-arms extending therefrom, the motor cover configured to snap-fit secure an individual Y-arm and an individual arm; and a tabbed circuit board assembly operably coupleable to the center body and configured to control the plurality motor assemblies based on radio frequency signals from the handheld remote control.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be formed or combined. Accordingly, the embodiments are not mutually exclusive combinations of features; rather, the invention may comprise a combination of different individual features selected from different individual embodiments, as understood by persons of ordinary skill in the art.

The entire content of each and all patents, patent applications, articles and additional references, mentioned herein, are respectively incorporated herein by reference.

The art described is not intended to constitute an admission that any patent, publication or other information referred to herein is "prior art" with respect to this invention, unless specifically designated as such. In addition, any description of the art should not be construed to mean that a search has been made or that no other pertinent information as defined in 37 C.F.R. § 1.56(a) exists.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A hovering flying craft adapted to be controlled by remote control, the craft comprising:
   a frame assembly including a center body having at least three arms extending outwardly from the center body and at least three legs extending downwardly from the center body;
   at least three motor assemblies that each include an electromechanical motor and at least one corresponding propeller operably mounted downwardly-facing, with at least one motor assembly operably mounted at a distal portion of each of the at least three arms;
   a circuit board assembly operably mounted to the center body and configured to control the craft in response to radio frequency signals; and
   a replaceable rechargeable battery insertable into a battery compartment defined in the center body and operably connectable to electrically power the circuit board assembly and the at least three motor assemblies.

2. The craft of claim 1, wherein the circuit board assembly is positioned and secured in the center body to provide structural support for the arms of the frame assembly.

3. The craft of claim 1, wherein the circuit board assembly includes a printed board having a plurality of tabs that extend outwardly from a central surface structure adapted to support circuit board assembly components, including a gyroscope, an accelerometer, a magnetometer, a microcontroller, and a radio.

4. The craft of claim 3, wherein the plurality of tabs includes a tab having a power connector for the rechargeable battery, and a tab having a radio frequency antenna for the radio.

5. The craft of claim 1, further comprising at least one multi-color LED operably connected to the circuit board assembly and configured to display a selectable color.

6. The craft of claim 1, further comprising a removable safety assembly mountable to and extending from the distal portion of the arms and configured to protect the propellers from lateral contact.

7. The craft of claim 1, wherein each of the motor assemblies include a motor cover that is configured to secure the motor to the arm by a snap fit.

8. The craft of claim 1, wherein the arms are formed of an injectable molded plastic having a durometer value greater than 70 Shore D and the legs are formed of an injectable molded plastic having a durometer value less than 60 Shore D.

9. The craft of claim 1, wherein the center body is formed of a two-piece structure that sandwiches the circuit board assembly to provide structural support for the frame assembly.

10. The craft of claim 1, wherein at least one of the at least three motor assemblies includes a second propeller operably mounted upwardly-facing, in addition to the at least one propeller operably mounted downwardly-facing.

11. The craft of claim 1, wherein the center body is formed of a top member having the at least three arms extending outwardly from the center body and a bottom member having the at least three legs extending downwardly from the center body, and wherein the battery compartment is located between the top member and the bottom member.

12. The craft of claim 11, wherein the circuit board assembly is positioned and secured in the center body to provide structural support for the top member and the arms of the frame assembly.

13. The craft of claim 1, wherein the at least three motor assemblies further include a fourth motor assembly that includes at least one propeller operably mounted downwardly-facing.

14. A hovering flying craft adapted to be controlled by remote control, the craft comprising:
   at least three means for rotating that each include at least one corresponding propeller operably mounted downwardly-facing;
   means for holding the at least three means for rotating, wherein the means for holding further includes at least three legs extending downwardly from the means for holding;
   means for controlling the craft in response to radio frequency signals, wherein the means for controlling is operably mounted to the means for holding the at least three means for rotating; and
   means for powering the at least three means for rotating, wherein the means for powering is insertable into a compartment defined in the means for holding and is operably connectable to supply electrical power to means for controlling and the at least three means for rotating.

15. The craft of claim 14, wherein the means for holding is formed of an injectable molded plastic having a durometer value greater than 70 Shore D and the legs are formed of an injectable molded plastic having a durometer value less than 60 Shore D.

16. A hovering flying craft adapted to be controlled by remote control, the craft comprising:
- a frame assembly including a center body having at least three arms extending outwardly from the center body and at least three legs extending downwardly from the center body;
- at least three motor assemblies that each include an electromechanical motor and at least one corresponding propeller operably mounted downwardly-facing, with at least one motor assembly operably mounted at a distal portion of each of the at least three arms;
- a circuit board assembly operably mounted to the center body and configured to control the craft in response to radio frequency signals;
- a replaceable rechargeable battery insertable into a battery compartment defined in the center body and operably connectable to electrically power the circuit board assembly and the at least three motor assemblies;
- at least one multi-color LED operably connected to the circuit board assembly and configured to display a selectable color; and
- a removable safety assembly mountable to and extending from a distal portion of each one of the at least three arms and configured to protect the propellers from lateral contact, wherein the circuit board assembly is positioned and secured in the center body to provide structural support for the arms of the frame assembly, wherein the circuit board assembly includes a printed board having a plurality of tabs that extend outwardly from a central surface structure adapted to support circuit board assembly components, including a gyroscope, an accelerometer, a magnetometer, a microcontroller, and a radio, wherein the plurality of tabs include a tab having a power connector for the rechargeable battery, a tab having a radio frequency antenna for the radio, wherein each of the motor assemblies include a motor cover that is configured to secure the motor to the arm by a snap fit, wherein the arms are formed of an injectable molded plastic having a durometer value greater than 70 Shore D and the legs are formed of an injectable molded plastic having a durometer value less than 60 Shore D, wherein the center body is formed of a two-piece structure that sandwiches the circuit board assembly to provide structural support for the frame assembly, and wherein at least one of the at least three motor assemblies includes a second propeller operably mounted upwardly-facing, in addition to the at least one propeller operably mounted downwardly-facing.

17. The craft of claim 16, wherein the center body is formed of a top member having the at least three arms extending outwardly from the center body and a bottom member having the at least three legs extending downwardly from the center body.

18. The craft of claim 16, wherein the center body is formed of a top member having the at least three arms extending outwardly from the center body and a bottom member having the at least three legs extending downwardly from the center body, and wherein the battery compartment is defined between the top member and the bottom member.

19. The craft of claim 1, wherein the at least three motor assemblies further include a fourth motor assembly that includes at least one propeller operably mounted downwardly-facing.

* * * * *